Figure 1:
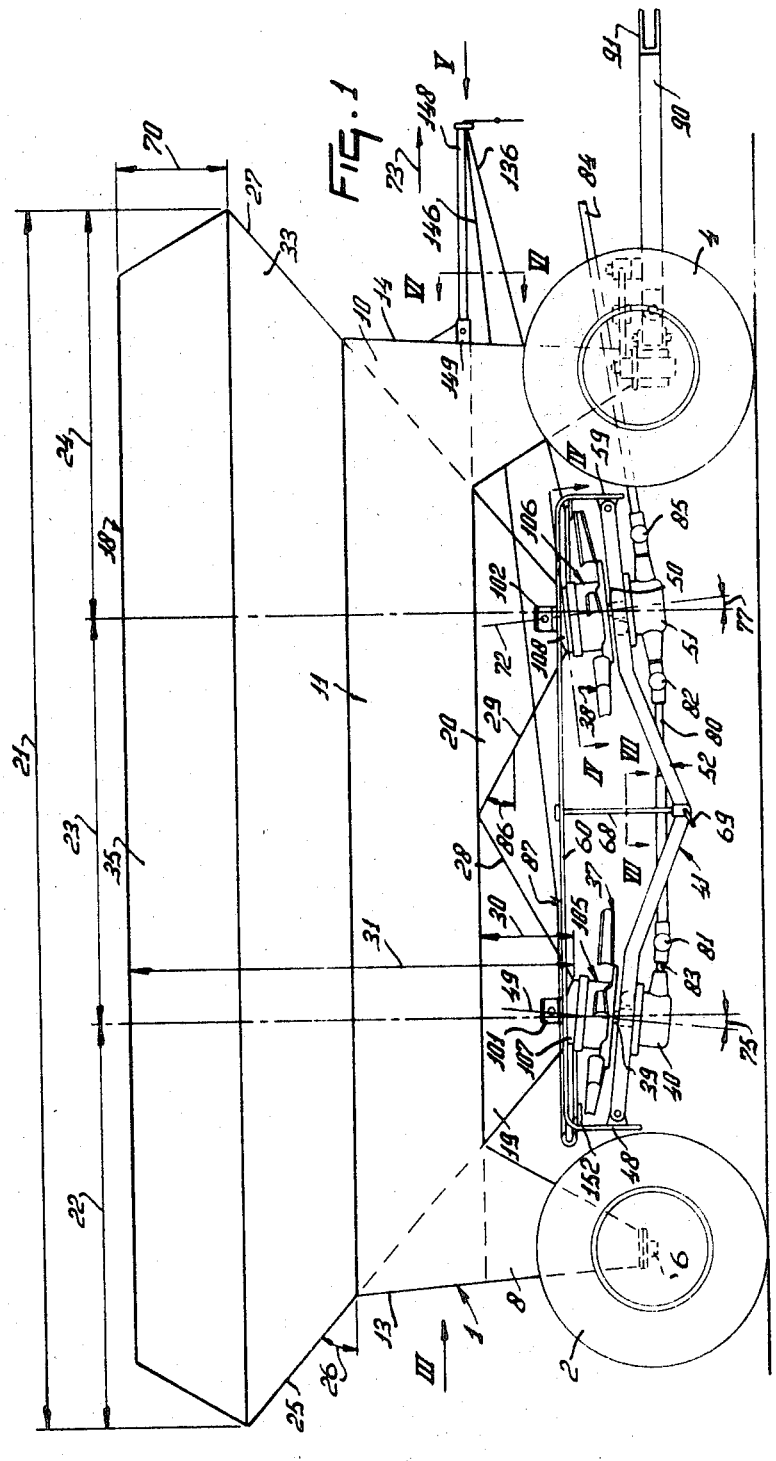

United States Patent
van der Lely

[15] 3,652,019
[45] Mar. 28, 1972

[54] DEVICES FOR DISTRIBUTING MATERIAL

[72] Inventor: Cornelis van der Lely, 7 Bruschenrain, Zug, Switzerland

[22] Filed: Feb. 16, 1970

[21] Appl. No.: 11,601

[30] Foreign Application Priority Data

Feb. 21, 1969 Netherlands..........................6902712

[52] U.S. Cl............................................................239/682
[51] Int. Cl.........................................................A01c 17/00
[58] Field of Search.........................................239/673, 682

[56] References Cited

UNITED STATES PATENTS 3,167,319  1/1965  Kerr......................................239/682

Primary Examiner—Lloyd L. King
Attorney—Mason, Mason & Albright

[57] ABSTRACT

A spreader device having a hopper on a frame supported on front and rear ground wheels. One or more rotatable spreaders are mounted beneath a nozzle at the lower side of the hopper and between the ground wheels, when viewed from aside. When a plurality of rotatable spreaders are included, they can be located side-by-side or in spaced relationship along the longitudinal center line of the device. The spreaders can be turned in the same or different directions. The device can be hitched to a prime mover and steered by an axle connecting its front ground wheels. Each rotary spreader can be controlled by its dosing mechanism having a control member extending to the front of the device. A guide hood can be positioned above the rotary spreader and the spreader supported on an adjustable portion of the frame. The hopper can be divided into several delivery funnels of different sizes.

30 Claims, 23 Drawing Figures

FIG. 1

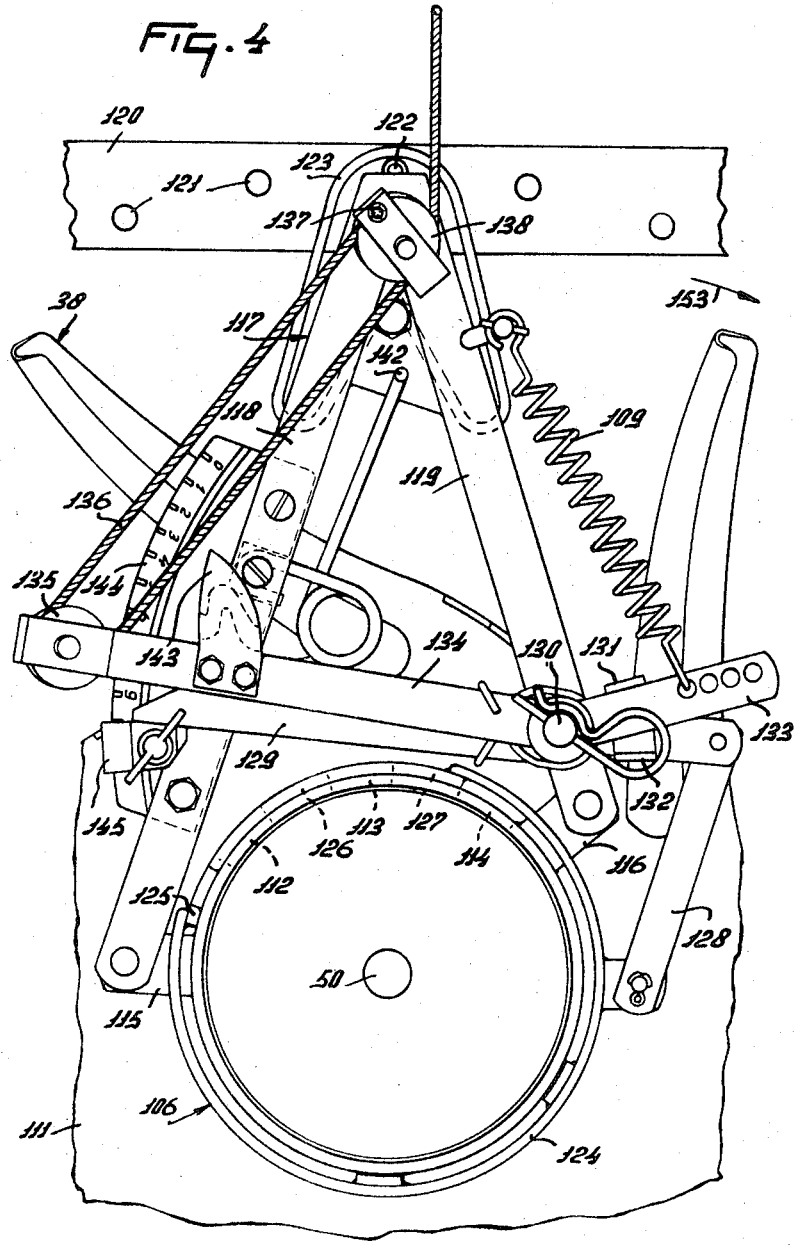

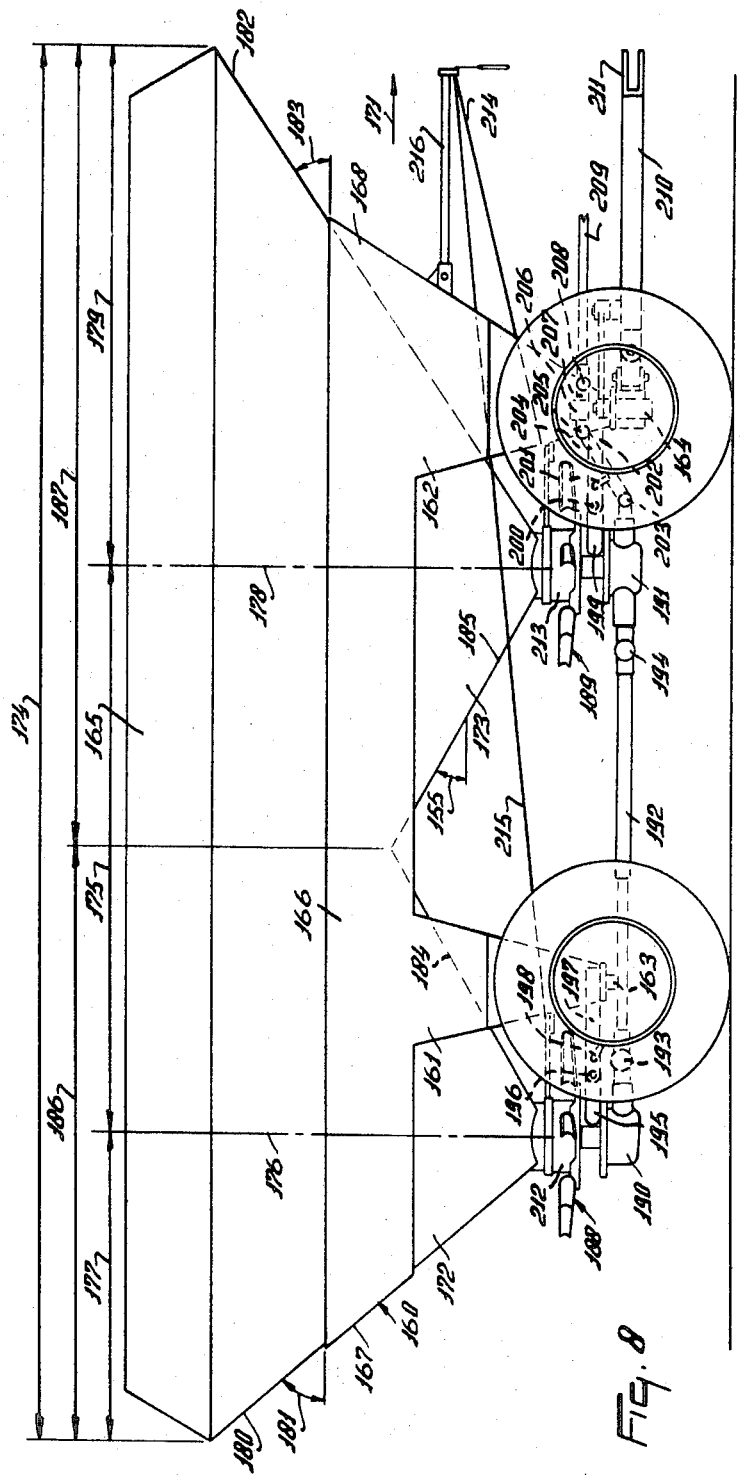

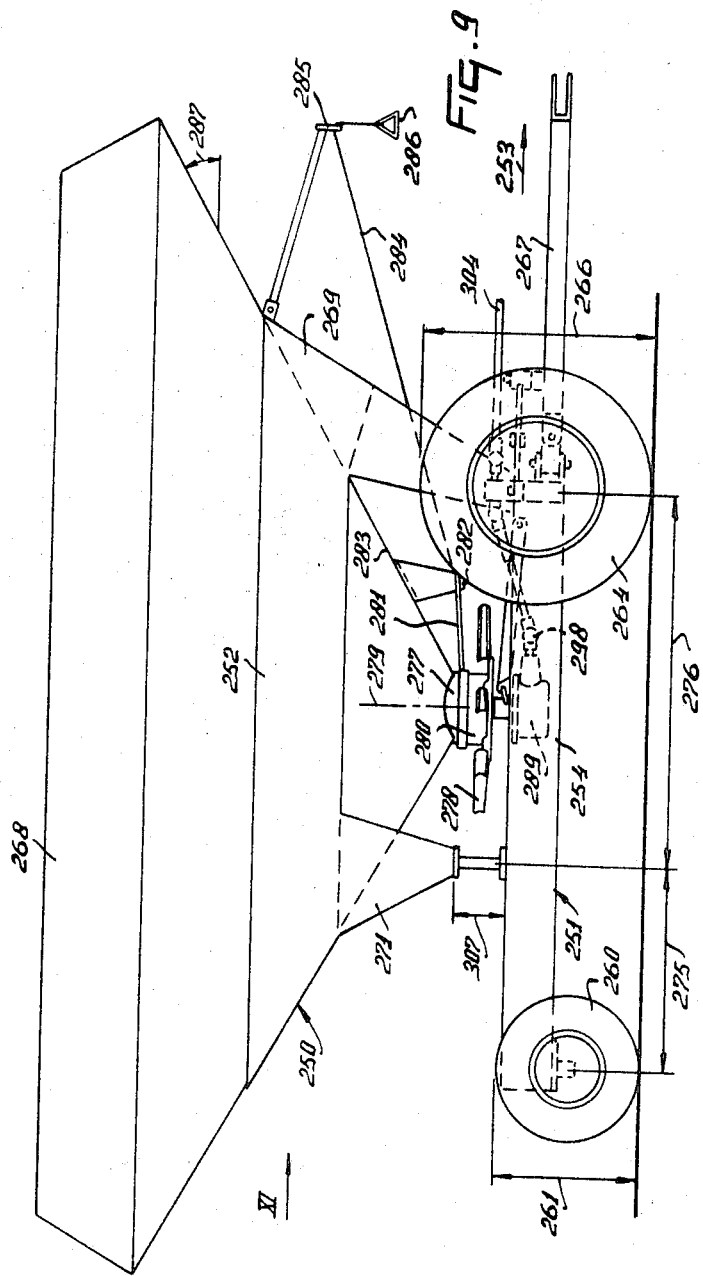

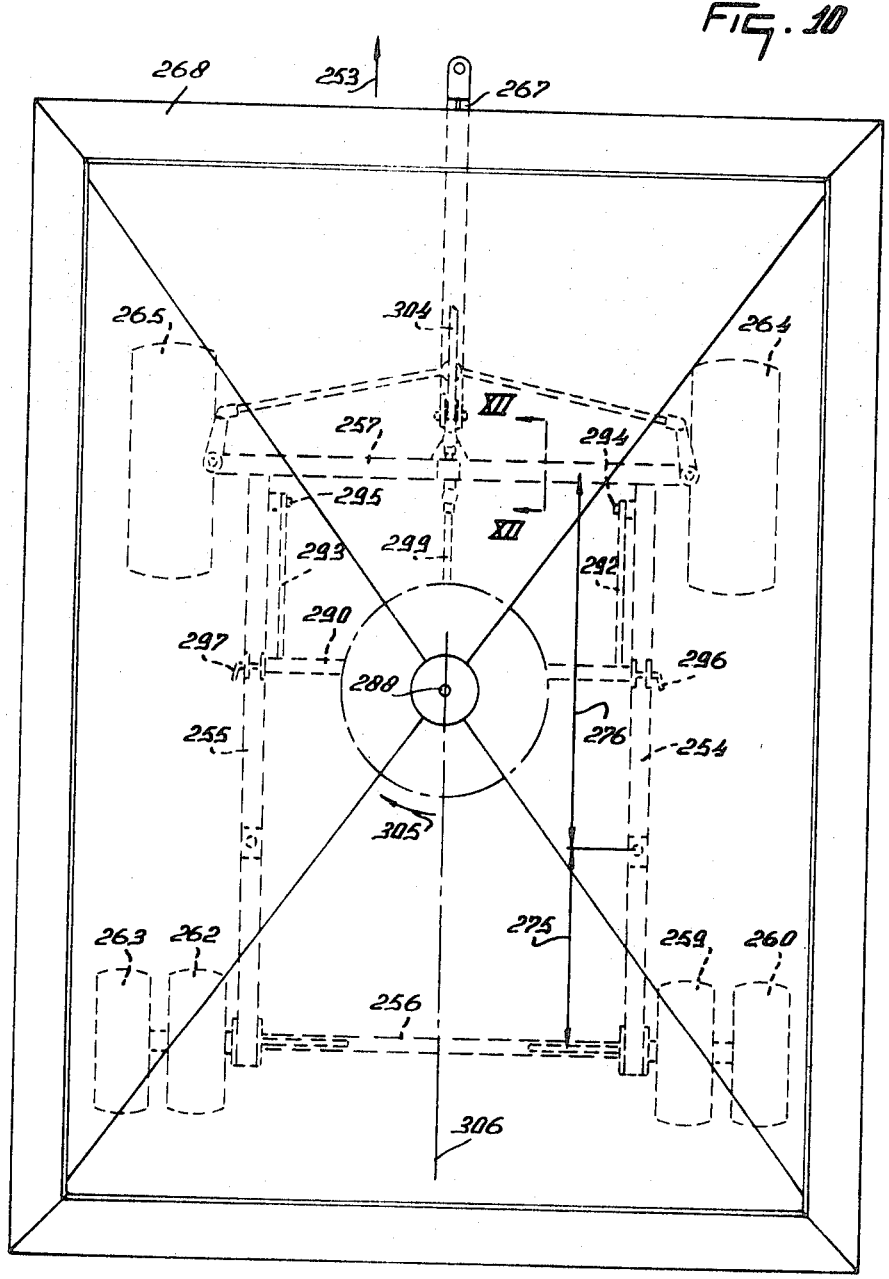

INVENTOR
CORNELIS VAN DER LELY

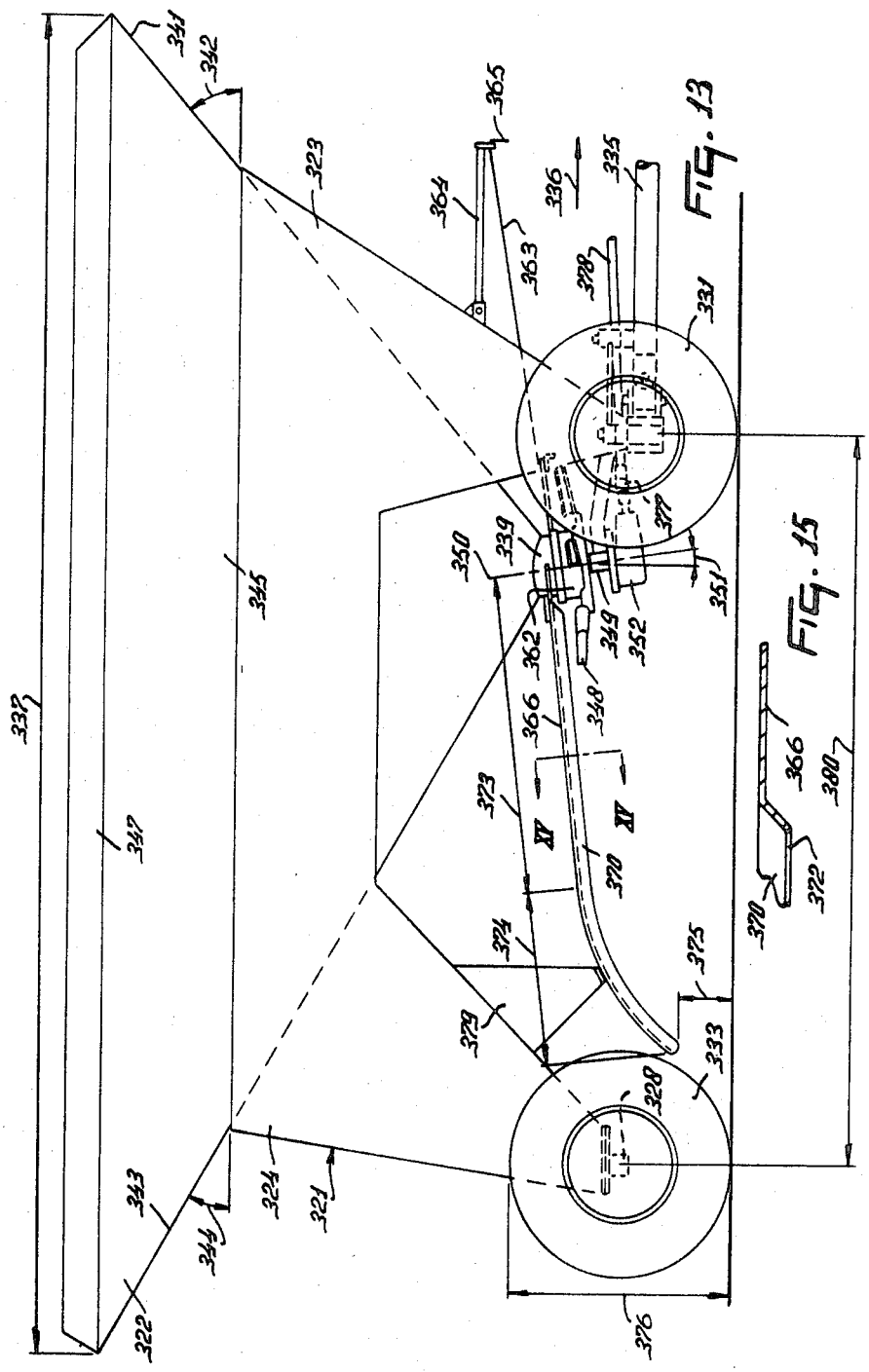

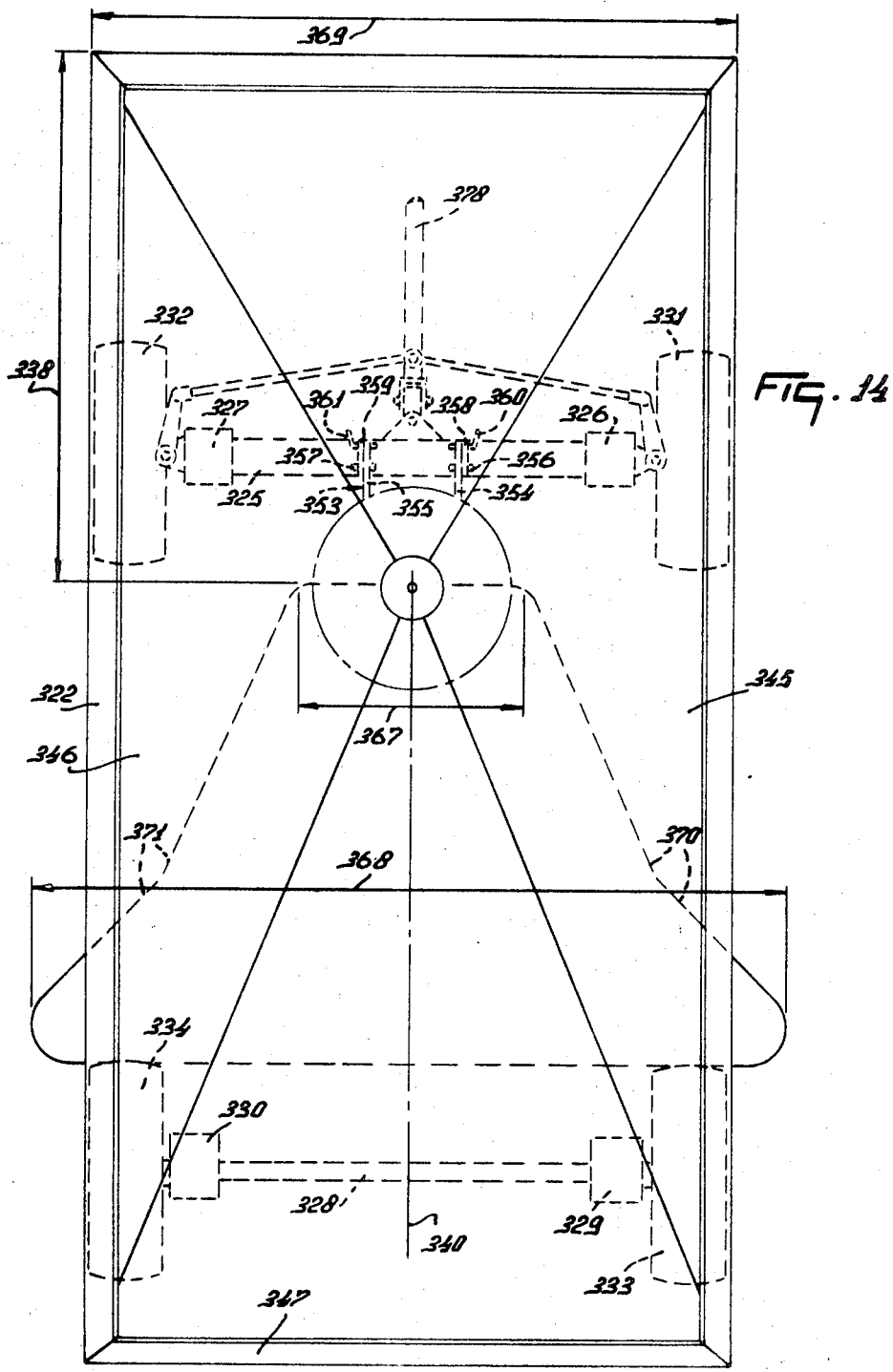

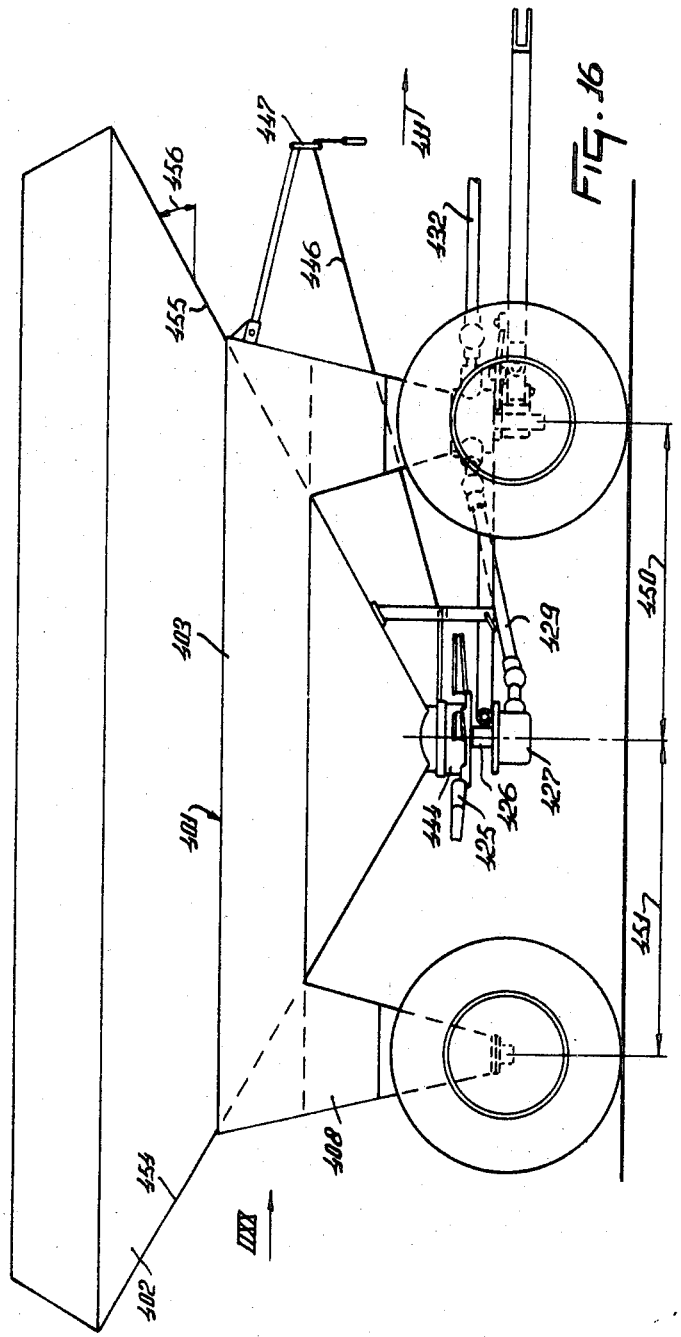

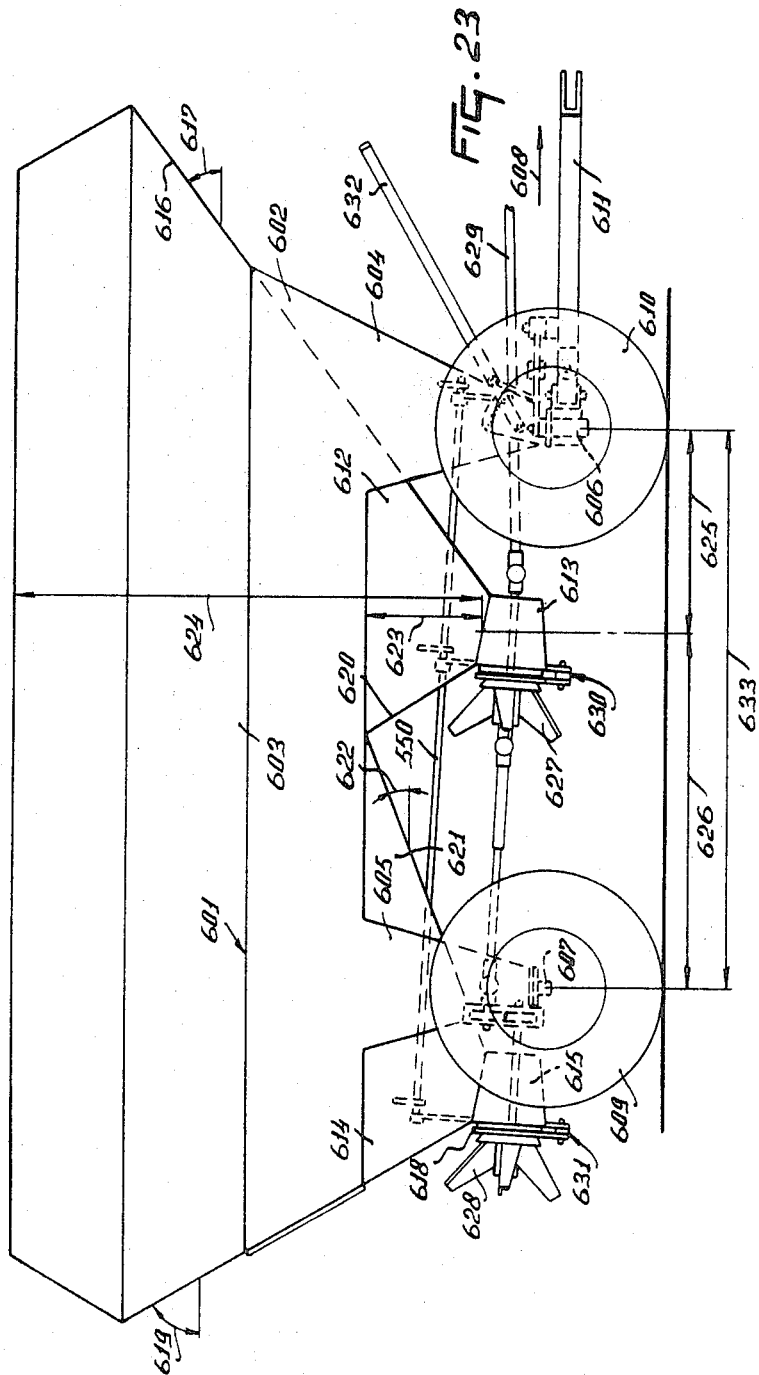

DEVICES FOR DISTRIBUTING MATERIAL

Object of the invention is to provide a device of the kind set forth by means of which material can be distributed in a simple manner over large areas. According to the invention this can be achieved by arranging a spreading member between the axles of the ground wheels, viewed transversely of the travelling direction and by connecting a ground wheel movably with the frame so that it can be steered by means of a coupling member by which the device can be coupled with a propelling vehicle, for example, a tractor.

An advantageous embodiment of the device according to the invention is obtained by providing it with two steerable ground wheels, which are arranged one at each end of an axle in the frame so as to be pivotable about vertical or substantially vertical axes.

In a further device embodying the invention the distribution of the material can be improved by providing the device with two spreading members adapted to turn about upwardly extending axes, said members being arranged side by side, viewed in the direction of movement of the device.

A further device embodying the invention capable of distributing the material in an advantageous manner can be obtained by providing it with two spreading members adapted to move about vertical or substantially vertical axes, one of which is located after the other, viewed in the direction of movement of the device. In a further construction of this embodiment the spreading members are inclined downwards in a direction towards each other. The material can thus be ejected without being hindered by parts of the device.

In a further embodiment of the invention the device comprises only one spreading member adapted to turn about an upwardly extending axis, which is located in a vertical plane going through the longitudinal axis of the device, the spreading member being arranged between the ground wheels, viewed transversely of the direction of movement.

A further embodiment of the invention comprises a guide hood joining the spreading member and located at one end above the spreading member and inclined downwardly away from the spreading member, substantially in the same direction in which the spreading member is inclined in the frame.

An advantageous embodiment of the device according to the invention can furthermore be obtained by providing it with two spreading members arranged one after the other viewed in the direction of movement and adapted to turn each about an axis extending substantially in the direction of movement of the device. The material can thus be distributed more in a vertical direction, which may be advantageous in covering given areas.

For a better understanding of the invention and to show how the same may be carried into effect, reference is made by way of example to the accompanying drawings, which show a few embodiments.

Figure 2:
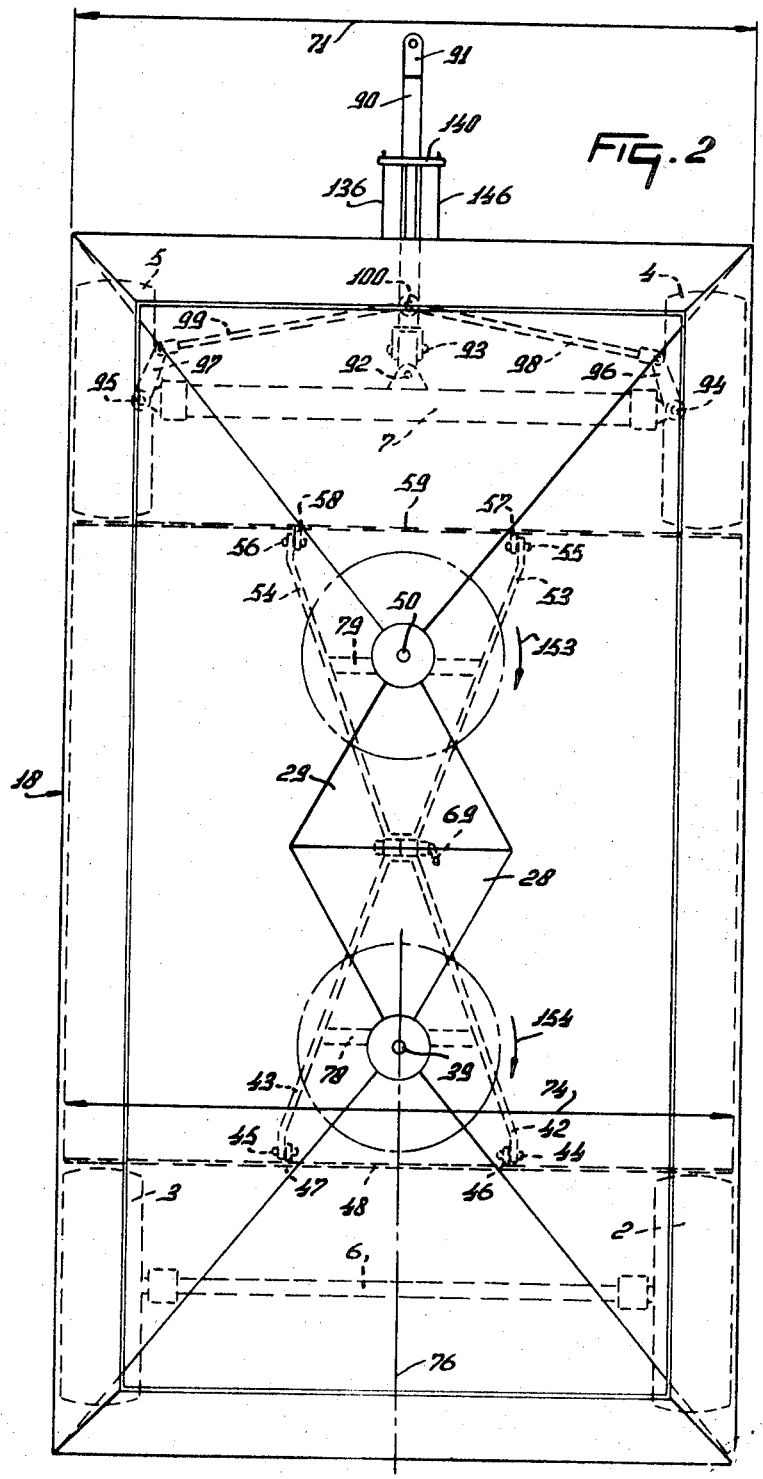
Figure 3:
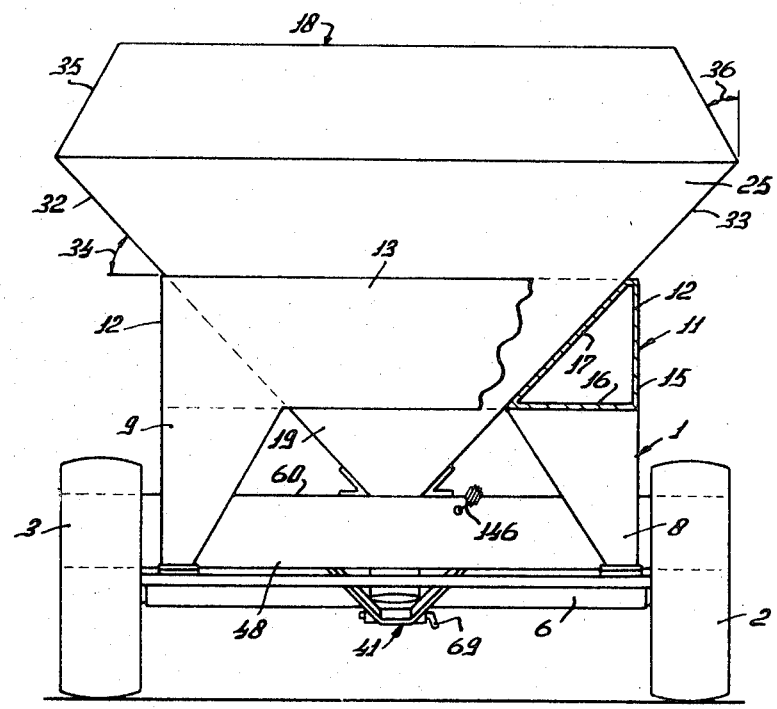
Figure 5:
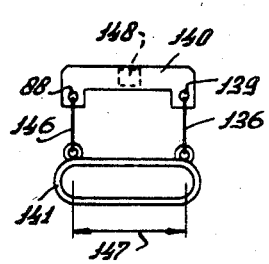
Figure 6:
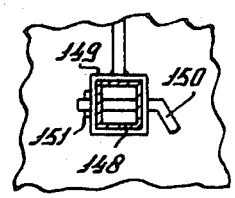
Figure 7:
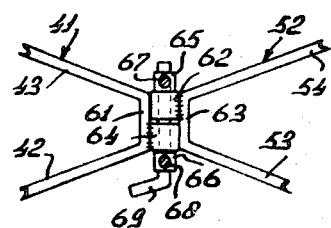

FIG. 1 is a side elevation of a device embodying the invention, comprising two spreading members arranged between the axles, FIG. 2 is a plan view of the device shown in FIG. 1, FIG. 3 is a rear view of the device shown in FIG. 1 viewed in the direction of the arrow III in FIG. 1, FIG. 4 is an enlarged plan view of a dosing mechanism between the hopper and the spreading member in the device of FIG. 1, FIG. 5 is an enlarged view in the direction of the arrow V in FIG. 1 of a control-member for the dosing mechanism, FIG. 6 is a sectional view taken on the line VI—VI in FIG. 1 of part of the connection of a supporting for the control-members of the dosing mechanism, FIG. 7 is a plan view taken on the line VII—VII in FIG. 1 of the connection of two supporting frames of the spreading members, FIG. 8 is a side elevation of a second embodiment of the invention, in which one spreading member adapted to turn about a vertical axis is arranged behind the axles of the device and a further spreading member is arranged between the axles, FIG. 9 is a side elevation of a distributing device according to the invention comprising one spreading member adapted to move about a vertical axis and arranged between two axles.

Figure 11:
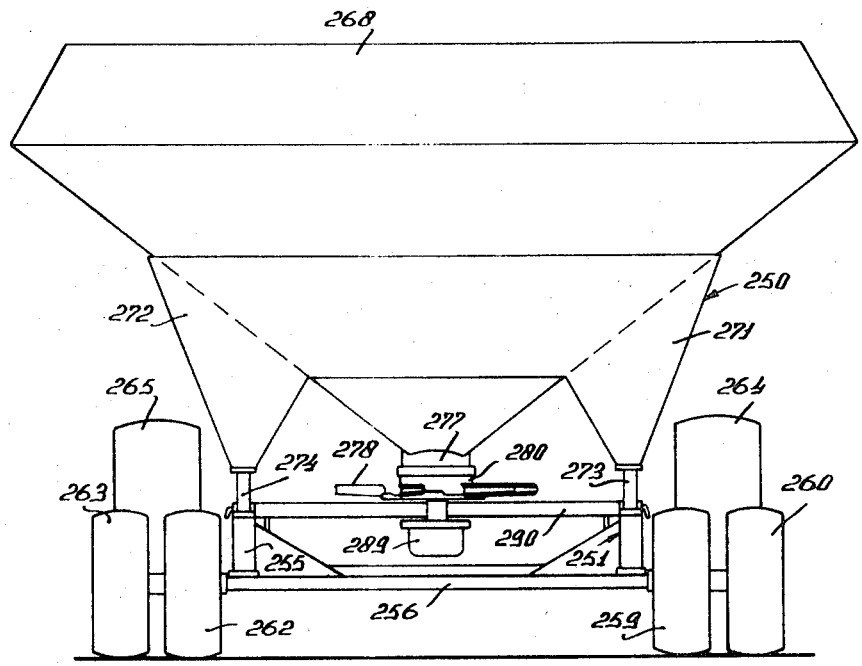
Figure 12:
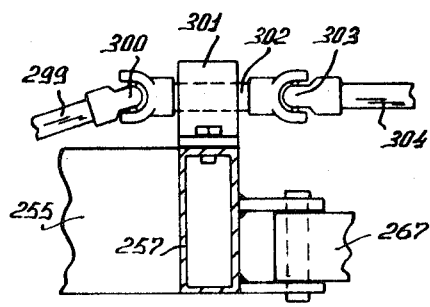
Figure 17:
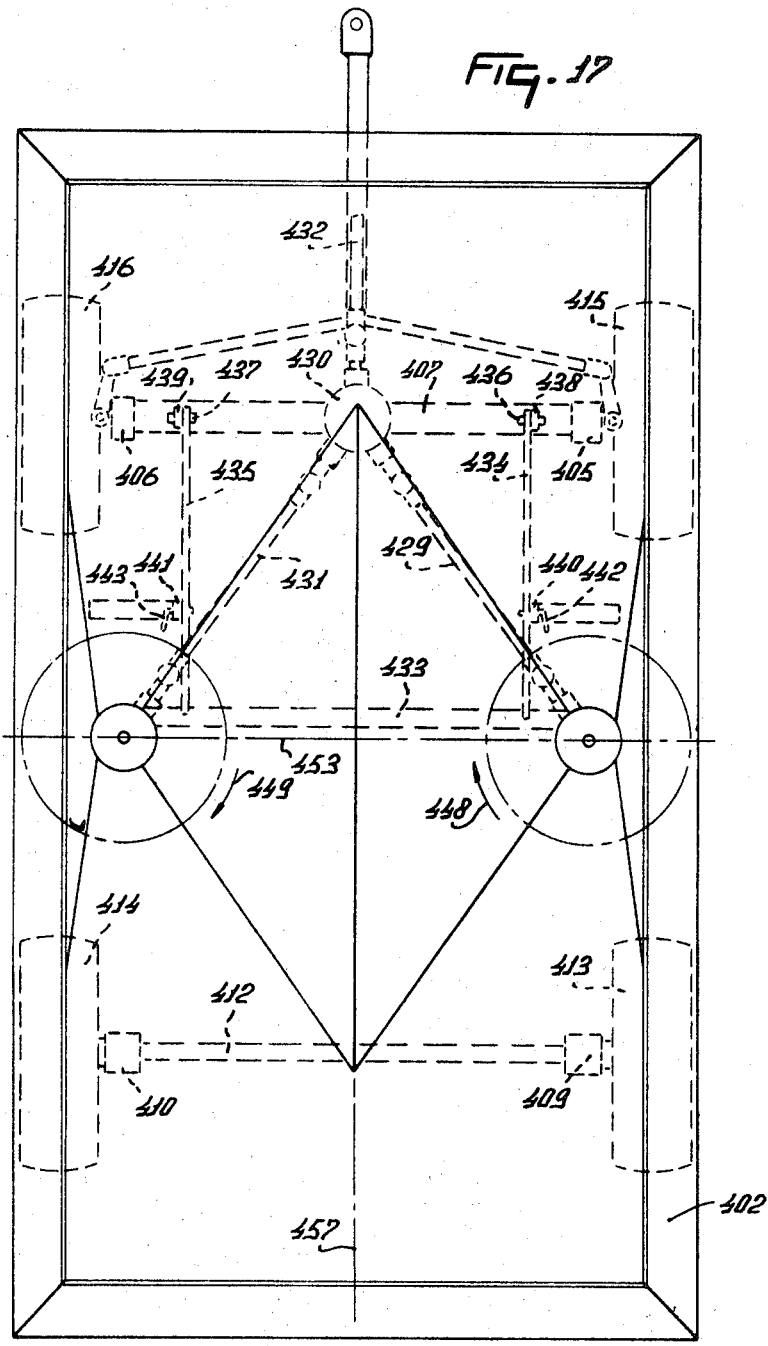
Figure 18:
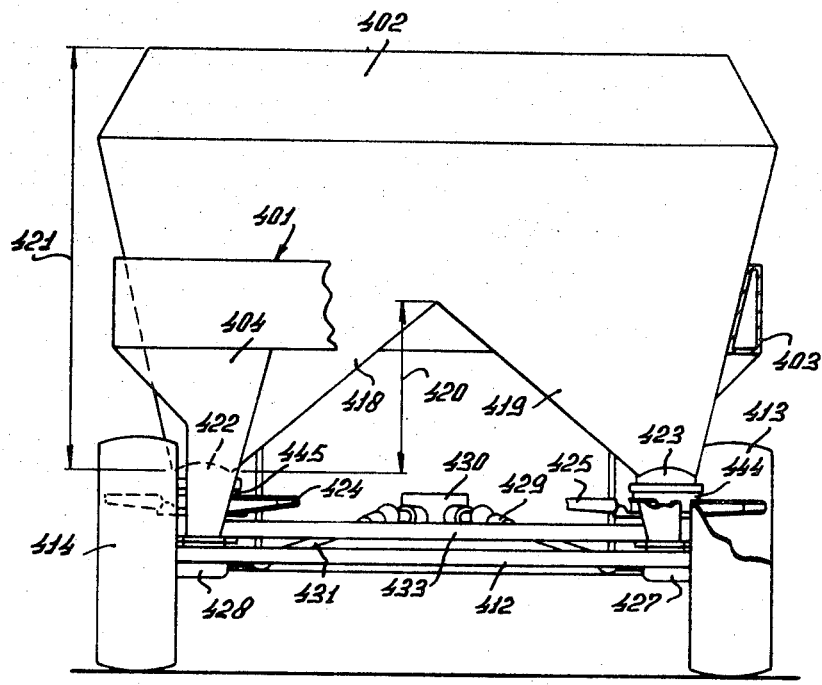
Figure 19:
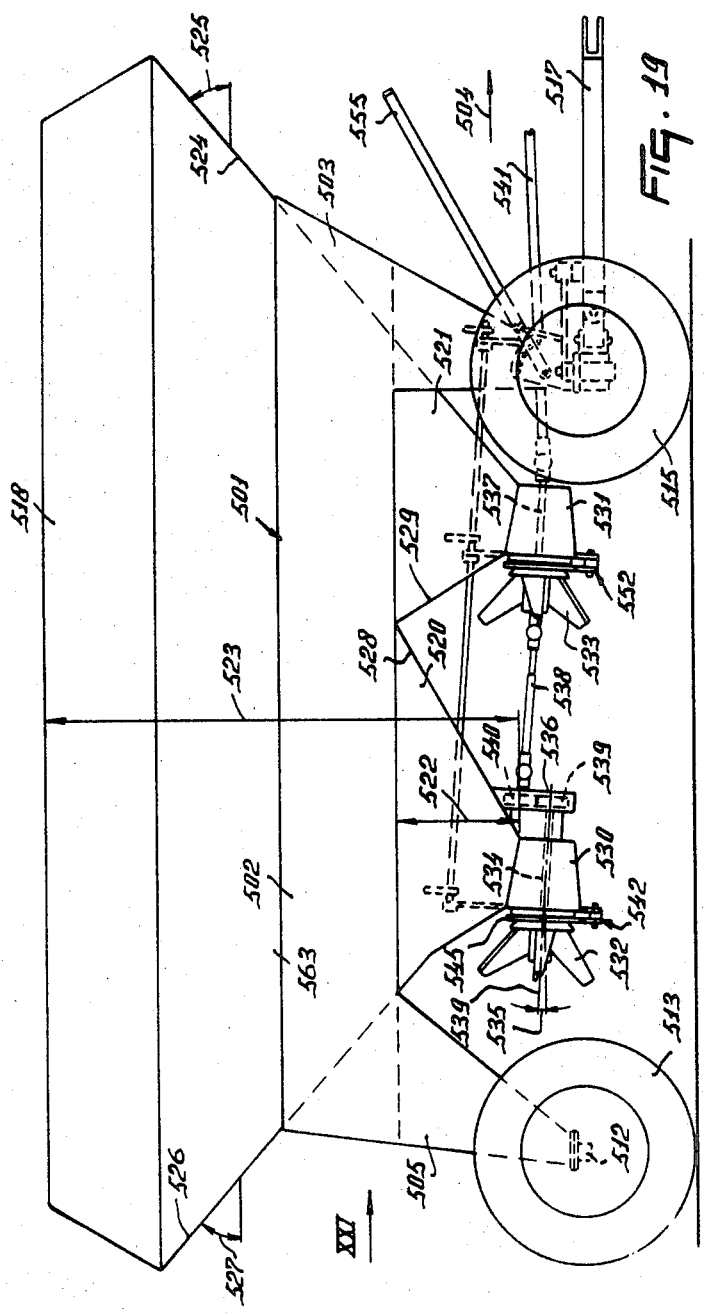
Figure 20:
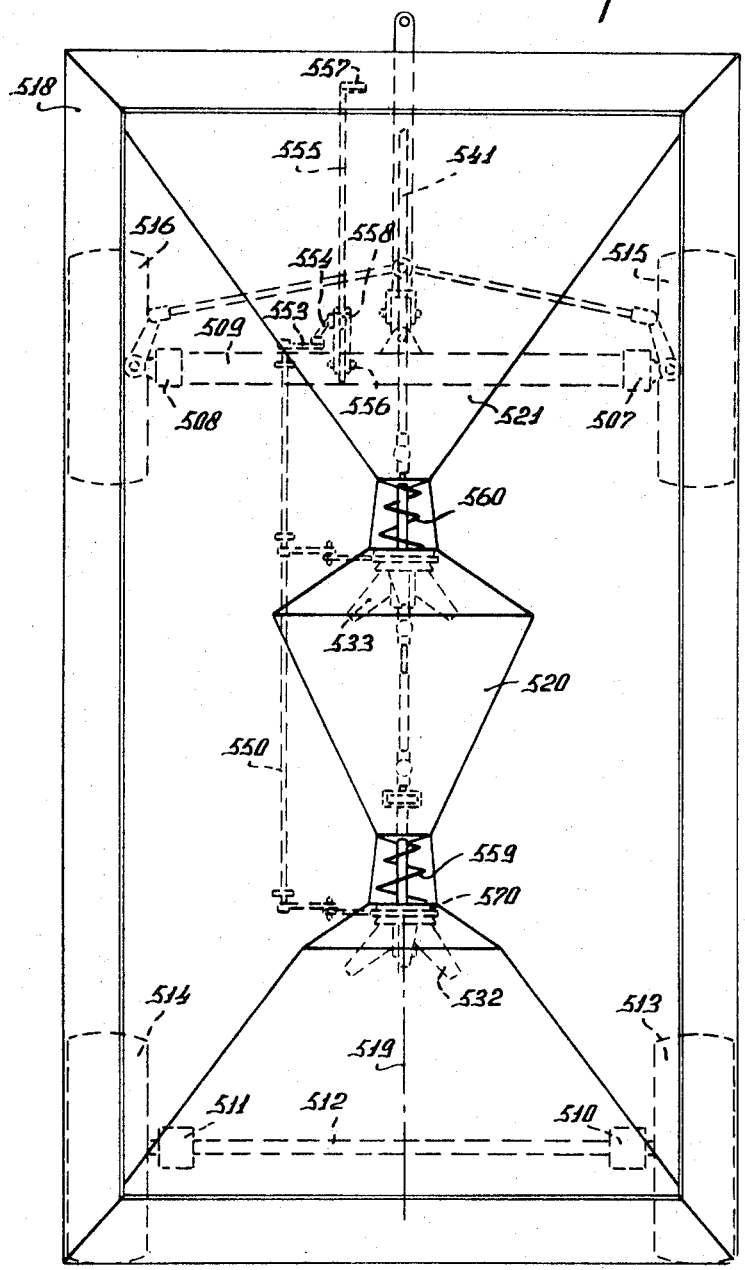

FIG. 10 is a plan view of the device of the kind shown in FIG. 9,

FIG. 11 is a rear view of the device shown in FIG. 9 in the direction of the arrow XI in FIG. 9, FIG. 12 shows the arrangement of part of the drive of the spreading member viewed in the direction XII—XII in FIG. 10, FIG. 13 shows a further embodiment of a spreading device in accordance with the invention, in which only one spreading member adapted to turn about an upwardly extending axis is arranged between the axles, FIG. 14 is a plan view of the device shown in FIG. 13, FIG. 15 is a vertical sectional view of part of a guide hood joining the spreading member, FIG. 16 is a side elevation of a further embodiment of the device according to the invention, in which two spreading members are arranged between the axles side by side viewed in the direction of movement of the device, FIG. 17 is a plan view of the distributing device of FIG. 16, FIG. 18 is a rear view of the device of FIG. 16, viewed in the direction of the arrow XVIII in said Figure, FIG. 19 is a side elevation of a further embodiment of a distributing device according to the invention, in which two spreading members are adapted to turn about rotary axes extending substantially in the direction of movement of the device, FIG. 20 is a plan view of the device of FIG. 19.

Figure 21:
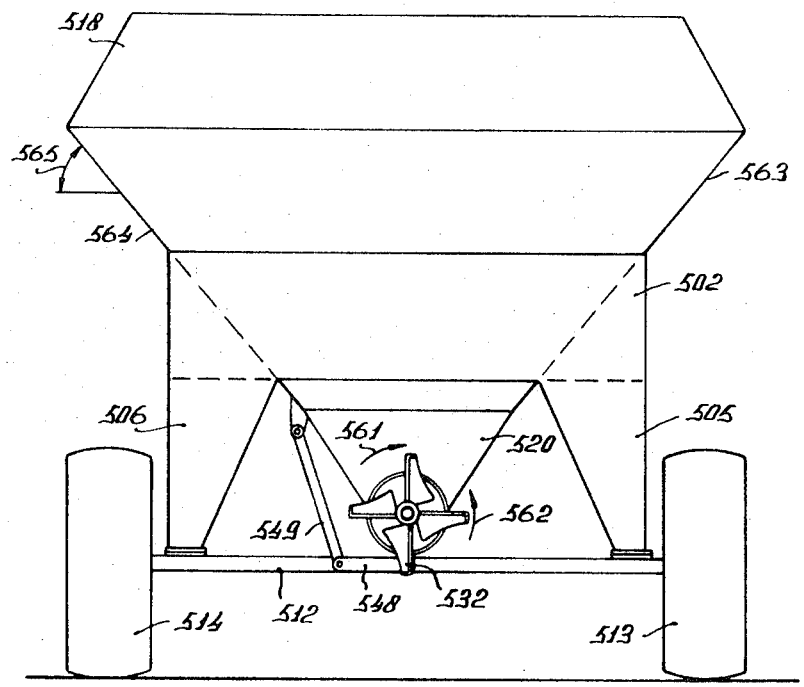
Figure 22:
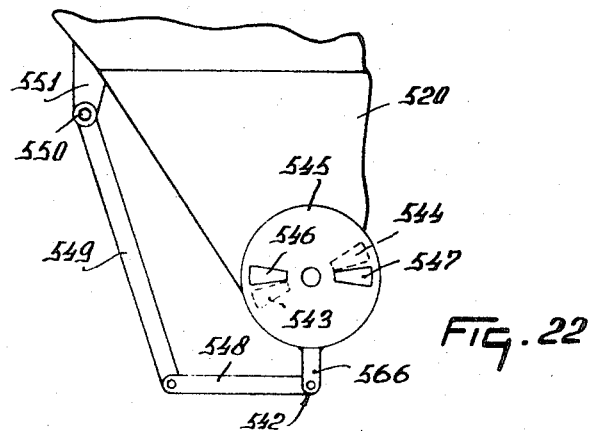

FIG. 21 is a rear view of the device of FIGS. 19 and 20, viewed in the direction of the arrow XXI in FIG. 19, FIG. 22 is an enlarged view of a dosing mechanism arranged between a spreading member and a delivery part of the hopper of the device of FIGS. 19 and 20, and FIG. 23 is a side elevation of a further embodiment of the device in accordance with the invention, in which one spreading member is arranged, viewed in the direction of movement, between two axles of the device and one spreading member is located behind the two axles.

The device shown in FIGS. 1 to 7 comprises a frame 1 and two backwheels 2,3 and two forewheels 4,5, viewed in the direction of movement. The ground wheels 2 and 3 are arranged at the ends of an axle 6, fixedly journaled in the frame. The ground wheels 4 and 5 are arranged at the ends of an axle 7, journaled in the frame. The frame 1 comprises supporting columns 8 and 9, rigidly secured to the axle 6 and two supporting columns, one (10) of which is shown in FIG. 1, are rigidly secured to the front axle 7. At the upper ends of the supporting columns the frame comprises a rectangular frame 11 having two long sides 12 and short sides 13 and 14. Each of the sides of the rectangular frame, as is illustrated for the side 12 in FIG. 3, is formed by a beam having a triangular vertical section and formed by sheets, the beam having a vertical side 15, a horizontal side 16 and a hypotenuse 17. The rectangular frame holds the hopper 18, whose capacity amounts to 2 to 10 cubic meters. The hopper preferably has a capacity of 6 to 8 cubic meters and in this embodiment 8 cubic meters. The hopper 18 has two downwardly tapering, funnel-shaped delivery parts 19 and 20. The delivery funnels 19 and 20 are spaced apart by a distance 23 equal to about one third of the overall length 21 of the hopper 18. The center of the delivery funnel 19 is spaced apart from the rear side of the hopper by a distance 22 equal to the distance 24 between the front side of the hopper and the center of the delivery funnel 20. The rear side 25, as well as the front side 27, is inclined at an angle 26 of about 45° to the horizontal plane. Between the delivery funnels 19 and 20 the oblique sides are each at an angle 86 of about 30° to the horizontal plane. Measured from the bottom side of the delivery funnels 19 and 20 each of them has a height 30 equal to about one fifth of the overall height 31 of the hopper.

In the longitudinal direction the hopper comprises inclined sides 32 and 33, each being at an angle 34 of about 45° to the horizontal plane (FIG. 3). On the upper side the hopper has an inwardly inclined rim 35, which is at an angle 36 of about 15° to the vertical. The inclined rim 35 extends over a height 70 approximately equal to one fifth of the height 31 of the hopper. The hopper has a width 71 approximately equal to half the length 21.

Beneath the delivery funnel 19 a spreading member 37 is adapted to turn about an upwardly extending rotary axis 49 and beneath the delivery part 29 a spreading member 38 is adapted to turn about an upwardly extending rotary axis 72. The spreading member 37 is fastened to a shaft 39, journaled in a gear box 40. The gear box 40 is arranged on a supporting frame 41. The supporting frame 41 comprises two beams 42 and 43 arranged in V-shaped fashion and diverging to the rear, viewed in the direction of movement 73. The rear ends of the beams 42 and 43 are rotatably connected with aligned pins 44 and 45, which are fastened to tags 46 and 47. The tags 46 and 47 are secured to a downwardly extending screening plate 48, which forms a bent over end of a covering plate 60. The covering plate 60 extends over a width 74, which is at least approximately equal to the width 71 of the device and the hopper. The outer sides of the plate 60 are level with the outer sides of the ground wheels 2 and 4 and 3, 5 respectively. The rotary axis 49 coincides with the center line of the shaft 39 and occupies an inclined position, being in this embodiment at an angle 75 of about 7° to the vertical. This angle is preferably not smaller than 4° and not larger than 12°. The rotary axis 49 is located in a vertical plane going through the longitudinal axis 76 of the device and is inclined to the front relative to the direction of movement 73. The spreading members 37 and 38 are arranged one behind the other between the wheels 2, 4 and 3, 5 respectively, viewed transversely of the direction of movement 73.

The spreading member 38 is fastened to a shaft 50, journaled in a gear box 51. The gear box 51 is fastened to a supporting frame 52 having two forwardly diverging beams 53 and 54. The supporting frame 52 is pivotally connected by the ends of the beams 53 and 54 with aligned pins 55 and 56, which are secured to tags 57 and 58 of a hanging screening plate 59, which forms a bent over portion of the covering plate 60. Both the screening plate 48 and the plate 59 extend from the upper side downwardly beyond the spreading members 37 and 38 respectively. The screening plate 48 is located, relatively to the direction of movement, at a short distance behind the spreading member 37 and the screening plate 49 is located at a short distance in front of the spreading member 38. The rotary axis 72 coincides with the center line of the shaft 50. The axis 72 is at an angle 77 of about 7° to the vertical and is also located in the vertical plane going through the longitudinal axis of the device. The rotary axis 72 is inclined to the rear, viewed in the direction of movement. The gear box 40 is secured to a transverse beam 78 of the supporting frame 41 and the gear box 51 is secured to a transverse beam 79 of the supporting frame 52. The frame 41 has a front end 61, interconnecting the beams 42 and 43 and having a tag 62 rigidly secured to it. The rear ends of the beams 53 and 54 of the supporting frame 52 are interconnected by a short side 63 having a tag 64. The tags 62 and 64 are located one on each side of the vertical plane going through the longitudinal axis 76 of the device and fit in between downwardly extending holders 65 and 66, arranged at the lower ends of rods 67 and 68, secured to the covering plate 60. Through the holes in the tags 62 and 64 and the holders 65 and 66 is taken a pin 69, which may be secured against displacement in the various holes, which is not shown in detail.

The transmission members in the gear box 40 are linked by an auxiliary shaft 80 to the driving members in the gear box 51. The auxiliary shaft 80 has at each end a universal joint 81 and 82 respectively, the universal joint 81 being detachable fro input shaft 83 of the gear box 40. The gear box 51 is furthermore coupled with a driving member formed by a driving shaft 84, which projects forwardly from the gear box 51 and is coupled with a shaft journaled in the gear box 51 by means of a universal joint 85. The auxiliary shaft 80, which is located at the center of the device is arranged between the rods 67 and 68 by means of which the supporting frames 41 and 50 are secured to the covering plate 60. The driving shaft 84 can be coupled with the power takeoff shaft of a tractor or the like, to which the device can be hitched.

For coupling the device with a tractor or a similar vehicle a coupling arm 90 is provided on the front axle 7 and provided at the front end with a coupling member 91. The coupling arm 90 is connected with the axle 7 so as to be pivotable about a vertical axis 92. Between the vertical shaft 92 and the coupling arm there is arranged a horizontal shaft 93, about which the coupling arm 90 is movable in a vertical sense.

The ground wheels 4 and 5 are steerable ground wheels and adapted to turn about vertical axes 94 and 95 relatively to the axle 7. Rods 96 and 97 are connected with the wheels 4 and 5 respectively and pivotally connected with rods 98 and 99 respectively, which are in turn pivoted to a vertical shaft 10 on the coupling arm 90 at a distance from the vertical shaft 92. A turn of the coupling arm 90 about the shaft 92 results in a turn of the wheels 4 and 5 about the vertical axes 94 and 95. The rods 98 and 99 may be longitudinally adjustable for obtaining a correct position of the wheels 4 and 5.

The covering plate 60 is provided with openings fitting around the delivery funnels 19 and 20. The covering plate 60 is located at the same level as the lower ends of the delivery funnels 19 and 20 and is fastened thereto by fastening tags 101 and 102 (FIG. 1).

Between the delivery funnel 19 and the spreading member 37 there is arranged a dosing mechanism 105 and a dosing mechanism 106 is arranged between the delivery funnel 20 and the spreading member 38. These dosing mechanisms 105 and 106 are joining cylindrical outlet nozzles 107 and 108 respectively provided at the lower ends of the delivery funnels 19 and 20. The cylindrical outlet nozzles 107 and 108 are centrally to the rotary axes 49 and 72 respectively.

The dosing mechanism 106 is shown in detail in FIG. 4 and comprises a cylindrical ring 110, the upper end of which surrounds the lower end of the cylindrical outlet nozzle 108. The lower end of the cylindrical ring 110 bears on the disc-shaped central portion 111 of the spreading member 38, which forms an ejecting member and comprises ejecting arms secured to the ejecting disc 111. The ring 110 has three outlet ports 112, 113 and 114. The ring 110 is provided with tags 115 and 116, which have connected with them an adjusting arm 117 comprising two rods 118 and 119 arranged in V-fashion. The arm 117 bears on a guide beam 120 having a plurality of holes 121. The arm 117 has a pin 122, which can be inserted at will into one of the holes 121. The pin 122, which is inserted from the lower side of the guide beam 120 through one of the holes 121 is secured to a tag of the arm 117 located beneath the guide beam 120. The arm 117 is provided with a spring 123, which holds the pin 122 by pressure in one of the selected holes 121. The ring 110 is surrounded by a ring 124 provided with three slides 125, 126 and 127. The ring 124 is coupled by a pivotal rod 128 with a lever 129. The lever 129 is afforded by the vertical shaft 130 and arranged on the strip 119. The lever 129 is provided with tags 131 and 132, spaced apart by such a distance that the arm 133 is allowed to move over a small angle between them. The arm 133 forms one end of an adjusting arm 134, adapted to turn about the shaft 130 and provided with a roller 135, around which a rope 136 is passed, one end of which is fastened to a tag 137 secured to the arm 117. Via the roller 135 the rope 136 passes along a roller 138 of the arm 117 to the front of the device, where the rope 136 is passed through a hole 139 (FIG. 5) in a supporting strip 140 and secured to a handle 141. The arm 117 is provided with a cam 142, which is adapted to cooperate with a stop 143 on the actuating arm 134. The strip 118 has a guide 144 with a dial. The guide 144 is provided with a stop 145 adapted to slide along the guide and to be fixed at will in one of a plurality of positions. The guide beam 120 is secured to the screening plate 59.

The dosing mechanism 105 is constructed in the same manner as the dosing mechanism 106 and will therefore not be described in further detail. The displaceable arm 117 of the dosing mechanism 106 is directed to the front viewed in the direction of movement 73 away from the dosing mechanism. The corresponding adjusting arms of the dosing mechanism 105 are directed to the rear, viewed in the direction of movement 73. The screening plate 48 is provided with a guide beam 152, which is similar to the guide beam 120. The rope fastened to the dosing mechanism 105 is passed along a roller 143 and further guide members (not shown) through a hole in the plate 48 and via guide members 87 on the upper side of the covering plate 60 to the recess 88 in the supporting arm 140. The rope 146 connected with the dosing mechanism 105 is also connected with the handle 141. The connecting place of the rope 136 with the handle 141 is located at a distance 147 from the connection of the rope 146 with the handle 141.

The supporting strip 140 is connected with the end of a supporting arm 148, arranged in a square holder 149, fastened to the front of the frame beam 14 of the supporting frame 11 holding the hopper 18. The arm 148 is locked in the holder 149 by a pin 150, which is secured in place by a safety pin 151.

The device serves for distributing granular or powdery material, for example, fertilizer. For distributing the material the device is coupled by the coupling arm 90 with a tractor or the like. The front end of the driving shaft 84 is coupled with the power takeoff shaft of the tractor. The material to be spread is brought into the hopper 18 and can be fed via the dosing mechanisms 105 and 106 to the spreading members 37 and 38. By the dosing mechanisms 105 and 106 the supply of material to the spreading members 37 and 38 can be cut off. The quantity of material fed per unit time from the hopper to the spreading members 37 and 38 is adjustable by means of the dosing mechanisms 105 and 106.

The quantity of material to be supplied per unit time can be regulated by means of the closing slides 125, 126 and 127, slidable to a greater or lesser extent over the outlet ports 112, 113 and 114. The position of the stop 145 along the guide 144 indicates the extent of closure of the outlet ports 112 to 114 by the slides 125 to 127. The position of the ring 124 with the closing slides 125 to 127 is determined by the position of the lever 129 at the stop 145, the spring 109 of the dosing mechanism drawing the arm 133 against the tag 131 and hence the arm 129 against the stop 145.

In the embodiment shown the ports 112 to 114 are completely open and the stop 145 with the lever 129 is located near the digit 10 of the scale on the guide 144. The ports can be completely closed by turning the lever 134 towards the cam 142, for which purpose the rope 136 is pulled. Via the arm 133, the tag 132 and the arm 129 the ring 124 is turned with the slides around the ring 110 so that the slides 125 to 127 completely cover the outlet ports 112 to 114. The stop 143 is brought into contact with the cam 142 so that it is retained behind the cam. When the rope 136 is again pulled, the stop 143 is loosened from behind the cam 142 and by means of the spring 152 it can again move into the position shown in FIG. 4. In the same manner the dosing mechanism 105 can be controlled by means of the rope 146.

During the movement, when the outlet ports are opened to a greater or lesser extent by the dosing mechanisms, the material flows from the hopper to the spreading members. The spreading members 37 and 38 are set rotating from the driving shaft 84 via the transmission members in the gear boxes 51 and 40. The transmission members are such that the spreading member 38 rotates about the axis 72 in the direction of the arrow 153, whereas the spreading member 37 rotates in the direction of the arrow 154 about the axis 49. The two spreading members 37 and 38 thus rotate in the same directions about the rotary axes. The ports 112, 113 and 114 in the dosing mechanism 106 are located so that the material fed to the spreading member 38 is ejected to the rear, viewed in the direction of travel 73. Owing to the backwardly inclined position of the axis 72 and hence that of the spreading member 38 the material is spread obliquely downwards to the rear. The material is ejected past beneath the spreading member 37 over a strip having a width exceeding that of the device. The effective spreading width may be 12 ms so that it covers a distance of 6 ms on either side of the longitudinal axis 76 of the device. The direction of spreading of the material can be adjusted by the arm 117 of the dosing mechanism 106, which can be displaced along the guide beam 120. The pin 112 of the arm 117 is then inserted into a different hole 121. By displacing the arm 117 along the guide beam 120 the ring 110 with the ring 124 is turned about the outlet nozzle 108 of the hopper 18 and fixed in a different position. The ports 112, 113 and 114 then occupy a different position around the axis 72 relatively to the direction of movement 73 so that the material will leave the circumference of the spreading member 38 at a different angle to the direction of movement 73. The dosing mechanism 105 can be adjusted so that the material ejected by the spreading member 38 is distributed on only one side of the longitudinal axis 76, for example, on the left-hand side relative to the direction of movement 73.

The dosing mechanism 105 can be turned relatively to the outlet nozzle 107 in the same manner as described for the dosing mechanism 106. The spreading member 37 will distribute the material to the front, since viewed in the direction of movement the dosing mechanism 105 is in an inverted position relative to the dosing mechanism 106. Owing to the forwardly inclined position of the spreading member 37 the material is ejected obliquely to the front past beneath the spreading member 38. The spreading member 37 will also distribute the material over a wide strip which may cover equal distances on either side of the longitudinal axis 76. However, by adjusting the dosing mechanism 105 the material may alternately be distributed only on one side of the longitudinal axis 76. The dosing mechanism 105 can be adjusted so that viewed in the direction of movement 73 the spreading member 37 ejects the material on the right-hand side of the longitudinal axis 76. When each of the spreading members distributes the material over equal distances on either side of the device, the material can be distributed during the movement uniformly over a wide strip of land. A uniform distribution of the material is guaranteed because any irregularity caused by one spreading member is practically compensated for by the other. If desired, for example, in row cultures, one spreading member can distribute the material on one side of the device and the other member distribute it on the other side.

The covering plate 60 with the downwardly bent over screening plates 48 and 59 prevents the material from being ejected against parts of the device or of its prime mover.

The dosing mechanisms 105 and 106 can be actuated from the tractor propelling the device, since the handle 141 is arranged so that it can be actuated from the tractor. If desired, the dosing mechanism 105 may be adjusted so that the spreading member 37 does not eject material, whereas the dosing mechanism 106 can be adjusted so that its spreading member does distribute the material.

Since the ropes 146 and 136 are secured to the handle 141 at a distance 147 from each other, the rope 136 can be actuated for opening or closing the dosing mechanism without the dosing mechanism 105 being operated. For this purpose the handle 141 is pulled forwards only on one side.

Since the front wheels 4 and 5 are steerable via the coupling arm 90, the device can correctly follow the propelling tractor. When no material should be distributed at the heads of the fields, the dosing mechanisms 105 and 106 can be closed by actuating the handle 141, while they can be re-opened into the predetermined position after reversal by re-actuating the handle 141.

The device shown can be employed successfully for distributing fertilizer or other material on large areas of land without the need for filling the hopper too often. It is therefore advantageous that the hopper can carry 2 to 12 tons of material, preferably about 8 tons.

FIG. 8 shows a device for distributing material comprising a frame 160. The frame 160 has two supporting columns 161 and 162 on one side of the device, secured to horizontal axles 163 and 164. On the other side the frame comprises supporting columns (not shown) corresponding to the columns 161 and 162. The frame 160 comprises on either side of the device long frame beams 166 of sheet material, one of which is shown in FIG. 8. On the rear side these frame beams 166 are interconnected by a broad strip 167. At the front the frame beams 166 are interconnected by a beam 168, which also interconnects the supporting columns 162 at the front of the device. The frame holds a hopper 165 having a capacity of about 8 cubic meters. The hopper comprises two delivery funnels 172 and 173, arranged one after the other viewed in the direction of movement 171. The hopper 165 has a length 174 and the vertical center line of the delivery funnel 172 is located at a distance 175 from the vertical center line of the delivery funnel 173 which is approximately equal to half the length 174 and in this embodiment it is about five-twelfths of the length 174. The center line 176 is located at a distance 177 from the rear side of the hopper which is approximately equal to one quarter of the length 174. The center line 178 is located at a distance 179 from the front side of the hopper which is approximately equal to one third of the length 174. The hopper has a rear wall 180 being at an angle 181 of about 50° to the horizontal plane and a front wall 182 being at an angle 183 of about 35° to the horizontal plane. The delivery funnel 172 has a front wall 184 which is approximately parallel to the wall 182. The rear side of the delivery funnel 173 has a wall 185 being at an angle of about 30° to the horizontal plane. The delivery funnel 172 is located at a length 186 and the delivery funnel 173 at a length 187 of the hopper. The length 187 is about 1.5-times the length 186.

Beneath the delivery funnel 172 a spreading member 188 is adapted to rotate about a vertical axis, which coincides with the center line 176. Beneath the delivery funnel 173 a spreading member 189 is adapted to rotate about a vertical axis which coincides with the center line 178. The spreading members are arranged so that viewed transversely of the direction of movement 171 in FIG. 8 the member 188 is located behind the ground wheels of the frame and the member 189 is located between the ground wheels. The spreading member 188 is located behind the spreading member 189 and the rotary axes 178 and 179 are located in the vertical plane going through the longitudinal axis of the device. The spreading member 188 is fastened to a vertical shaft journaled in a gear box 190, whereas the spreading member 189 is secured to a vertical shaft journaled in a gear box 191. The gear boxes 190 and 191 are coupled with each other by an auxiliary shaft 192 and universal joints 193 and 194. The gear box 190 is fastened with the spreading member 188 to a supporting frame 195, which is adapted to turn about a horizontal shaft 196, fastened to a frame beam 197. The supporting frame 195 can be prevented from turning about the horizontal shaft 196 by means of a locking pin 198, which can be taken through an opening in the frame beam 197 and an opening in the supporting frame 195. In the same manner the gear box 191 is connected together with the spreading member 189 to a supporting frame 199, which is adapted to turn about a horizontal shaft 200, which can be fixed by a locking pin 201 to a frame beam 202.

The gear box 191 is linked at the front by means of a universal joint 203 to an auxiliary shaft 204, which is coupled by means of a universal joint 205 with a shaft 207 journaled in a bearing 206. The shaft 207 is coupled by means of a universal joint 208 with a driving shaft 209. The shaft 209 can be coupled with the power takeoff shaft of a tractor or the like moving the device.

The device can be attached to a tractor by means of a coupling arm 210 having a coupling member 211 at the front. The coupling arm 210 is connected with the device in the same manner as the coupling arm 90 of the embodiment shown in FIGS. 1 to 7. The arrangement of the coupling arm 210 in this second embodiment need therefore not be described further.

Between the delivery funnel 172 and the spreading member 188 is arranged a dosing mechanism 212 and a dosing mechanism 213 is arranged between the delivery funnel 173 and the spreading member 189. The dosing mechanism 213, corresponding with the dosing mechanism 106 of the first embodiment, is provided with a rope 214 by means of which it can be actuated from the front of the device. The dosing mechanism 212 can be compared with the dosing mechanism 106 and it is provided with a control-rope 215, which also extends to the front of the device. The rope 214 and 216 are connected with a supporting arm 216 in the manner similar to that of the first embodiment, so that further explanation may be superfluous.

For using the device the hopper 165 is filled with the material to be spread and the coupling arm 210 is attached to the tractor. The auxiliary shaft 209 is connected with the power takeoff shaft of the tractor. For distributing the material the spreading members 188 and 189 are caused to rotate about their axes by the power takeoff shaft via the transmission members described above. During the movement of the device the material fed from the hopper to the spreading members is distributed over a wide area. The dosing mechanisms 213 and 212 can be actuated in the same manner as in the preceding embodiment. Also in this device one spreading member can distribute the material on one side of the longitudinal axis of the device and the other can distribute it on the other side of the longitudinal axis. If desired, the two spreading members can distribute the material over the same strip covering equal distances on either side of the longitudinal axis. This second embodiment is also extremely suitable for carrying a great quantity of material in the hopper and for covering large areas of land for example with fertilizer without the need for the hopper to be filled too often.

In this embodiment the length 186 is smaller than the length 187 so that the funnel 172 may no longer receive material when the material is still available for the funnel 173. This may occur when the two spreading members 188 and 189 distribute per unit time equal quantities of material by the identical adjustment of the dosing mechanisms 212 and 213.

However, by a given adjustment of the dosing mechanism 213 the spreading member 189 can be caused to distribute a larger quantity per unit time than the spreading member 188. The dosing mechanism 212 is adjusted differently from the dosing mechanism 213. Distribution of material on the same strip by the two spreading members may be important for obtaining a more uniform distribution spectrum. If desired, the hopper 165 may be filled with two kinds of material, so that above the delivery funnel 172 the material differs from that above the funnel 173. The spreading member 189 can thus distribute other material than the spreading member 188. The capacities of the delivery funnels and of the associated hopper portions may be adapted so that as in the embodiment of FIG. 8 the capacity of the funnel 172 with the associated hopper portion is smaller than that of the delivery funnel 173 with the associated hopper portion. For example, there may be provided material above the delivery funnel 173 of which 1.4-times as much has to be distributed than the material provided above the delivery funnel 172. If desired, the capacities of the delivery funnel 173 with the associated hopper portion and of the delivery funnel 172 with the associated hopper portion may be chosen with a given ratio. In this case the shape of the hopper and the provision of two spreading members may be particularly important.

The dosing mechanisms 212 and 213 are arranged above the spreading members 188 and 189 so that the latter distribute the material both to the rear.

FIGS. 9 to 12 show an embodiment having only one spreading member arranged between two axles. This embodiment comprises a frame 250 having a framework 251 and a framework 252 holding a hopper 268. The framework 251 comprises two frame beams 254 and 255 extending in the direction of movement 253. The ends of these beams are interconnected by axles 256 and 257 respectively. The axle 256 has at one end two ground wheels 259 and 260 having a diameter 261. The other end of the axle 256 is provided with ground wheels 262 and 263 having the same diameter as the wheels 259 and 260. The diameter 261 is such that the upper side is approximately level with the upper sides of the frame beams 254 and 255. The ends of the axle 257 are provided with wheels 264 and 265 each having a diameter 266. The diameter 266 is approximately 1.5-times the diameter 261 of the wheels on the rear axle 256. In this embodiment the diameter 266 is 8/5-times the diameter 261. The wheels 264 and 265 are steerable and are coupled with a coupling member formed by a coupling arm 267, by means of which the device can be attached to a tractor or the like. The connection of the wheels 264 and 265 with the axle 257 and its coupling with the arm 267 correspond with the structure of the first embodiment so that further details may be dispensed with.

The framework 252 is rectangular and like in the preceding embodiments it consists of sheet material. The framework 252 is integral with the supporting columns. At the front the framework 252 comprises columns 269 and 270, fastened to the axle 257 near its ends. On the rear side the framework 252 comprises columns 271 and 272, which are secured to the beams 254 and 255 by means of comparatively thin circular-section supports 273 and 274. The supports 273 and 274 bear on the beams 254 and 255 at a distance 275 from the axle 256 which is approximately half the distance 276 between the axle 257 and the place where the supports 273 and 274 are seated on the beams 254 and 255.

The hopper 268 is symmetrical to the vertical plane containing the longitudinal axis of the device and extending in the direction of movement 253. The hopper 268 has a capacity of about 8 cubic meters and is provided on the bottom side at the center with a delivery nozzle 277. Beneath the delivery nozzle 277 a spreading member 278 is adapted to rotate about a vertical axis 279. The axis 279 coincides with the center line of the cylindrical delivery nozzle 277. Between the delivery nozzle 277 and the rotatable spreading member 278 there is arranged a dosing mechanism 280, which has the same structure as the dosing mechanism 106 of the first embodiment. The dosing mechanism 280 will therefore not be described further.

The dosing mechanism 280 is provided with an adjusting mechanism 281 similar to the adjusting mechanism of the dosing mechanism 106. The adjusting mechanism 281 bears on a strip 282 suspended to the inclined front side 283 of the hopper. The adjusting mechanism 281 comprises a rope 284, held at the front by a supporting arm 285 identical to the supporting arm 148 of the first embodiment. The supporting arm 285 in this embodiment extends from its fastening point on the frame slightly obliquely in downward direction. The rope 284 is provided with a handle 286.

The front 283 of the hopper is at an angle 287 of about 30° to the horizontal plane. The spreading member 278 is fastened to a vertical shaft 288, which is journaled in a gear box 289. The gear box 289 is secured to a frame beam 290, arranged between beams 254 and 255. The ends of the beam 290 are secured to arms 291 and 292, which are pivoted to the beams 254 and 255 by means of two pine 294 and 295 located in line with each other. A turn about the pins 294 and 295 can be prevented by means of locking pins 296 and 297 adapted to cooperate with recesses in the beam 290. In the locked position the beam 290 with the arms 293 and 292 occupies a position parallel to the beams 254 and 255.

By means of a universal joint 298 the gear box 289 has coupled with it an auxiliary shaft 299, which is connected by means of a universal joint 300 (FIG. 12) with a shaft 302 journaled in a bearing 301. The shaft 302 is connected through a universal joint 303 with a driving shaft 304, which can be coupled with the power takeoff shaft of a tractor to which the device is attached.

For taking the device into use it is attached by the coupling arm 267 to a tractor or the like, while the driving shaft 304 is coupled with the power takeoff shaft. For spreading material the hopper 268 is filled. During transport of the device from the place of filling to the area where the material has to be spread the dosing mechanism 280 remains closed. For spreading the dosing mechanism can be opened by means of the actuating mechanism 281 by pulling the handle 286 into a predetermined position. This position regulates the quantity of material fed per unit time from the hopper to the spreading member 278. During spreading the spreading member 278 is caused to rotate about the axis 279 in the direction of the arrow 305. The material is distributed over a wide strip mainly to the rear, viewed in the direction of movement 253. The material is distributed over a width of, for example, about 12 ms. The dosing mechanism can be adjusted so that the material is spread over equal distances on either side of the longitudinal axis 306. As an alternative, the dosing mechanism can be adjusted so that the material is distributed mainly only on one side of the longitudinal axis 256.

The supports 273 and 274 are level with the spreading member 278 so that the path of ejection of the material is practically not disturbed by frame parts. The supports 273 and 274 have a height 307 from the upper sides of the beams 254 and 255 up to the upper side of the dosing mechanism 280. The wheels 259 and 260 and 263 have such a large diameter that their upper sides are at a lower level than the spreading member 278. The material is thus ejected substantially over and across these wheels by the spreading member. The material can thus be distributed uniformly over the area concerned during the movement of the device. The shaft 279 of the ejector disc is located, viewed in the direction of movement 253 approximately midway between the axle 257 an the supports 273 and 274. In this embodiment the axis 279 is substantially perpendicular, when the device is in the horizontal position and it is located in the vertical plane going through the longitudinal axis 306 of the device. However, in principle the rotary axis 279 may have a position such that it is at a small angle to the vertical in the horizontal position of the device.

Owing to the capacity of the hopper 278 a large quantity of material can be carried for spreading over a large area. The weight of the implement with full hopper is advantageously transferred to the ground by the large front wheels 264 and 265 and the four smaller wheels without too deep tracks being carved or the ground being damaged in other ways. It is further advantageous that the wheels 264 and 265 are steerable so that the device can correctly follow the tractor. When the device is moved across the field, a constant flow of material is produced by the inclined position of the hopper from the hopper to the delivery nozzle 277. This is important for obtaining a uniform distribution. The sidewalls of the hopper are at a larger angle to the horizontal plane than the front and rear walls. Also in this embodiment, as will be apparent from the Figures, the hopper has an inwardly bent over upper rim. This is advantageous when filling the hopper, while spilling of material across the upper sides of the rims of the hopper, when being full, is practically avoided.

FIGS. 13 and 14 and 15 show an embodiment having a frame 321. The frame 321 has on its upper side a framework holding a hopper 322. The frame 321 has at the front two supporting columns 323, only one of which is shown. On the rear side the frame 321 comprises two supporting columns 324, only one of which is shown in FIG. 13. The supporting columns 323 bear on an axle 325, for which purpose plates 326 and 327 are provided at the ends of said axle. The supporting columns 324 bear on a rear axle 328 and are secured to horizontal plates 329 and 330 near the ends of the axle 328. At the ends of the axle 325 steerable ground wheels 331 and 332 are provided and the axle 328 is provided with ground wheels 333 and 334. The steerable ground wheels 331 and 332 are coupled with a coupling arm 335, which is fastened to the axle 325 and coupled with the steerable wheels 331 and 332 in the same manner as indicated in the preceding embodiments so that further description is dispensed with.

The frame 321 is made of sheet material and may be integral with the hopper 322. The hopper has a length 337 in the direction of movement 336 and at a distance 338 from the front of the hopper a delivery nozzle 339 is provided at the bottom of the hopper. The distance 338 is approximately 2/5th of the length 337. The delivery nozzle 339 is located at the center in a direction of width of the device and the center of the nozzle 339 is located in a vertical plane going through the longitudinal axis 340 of the device. The front side 341 of the hopper is at an angle 342 of about 40° to the horizontal plane, whereas the rear side 343 is at an angle 344 of about 30° to the horizontal plane. The delivery nozzle 339 is cylindrical and the sidewalls 345 and 346 on either side of the device extend from the upper side of the hopper obliquely towards the delivery nozzle 339. On the upper side the hopper has a rim 347 slightly bent over inwardly. Beneath the delivery nozzle 339 a spreading member 348 is adapted to rotate about an upwardly extending axis. The spreading member 348 is fastened to a shaft journaled in a bearing 349. The center line 350 of the bearing 349 and the rotary axis of the spreading member 348 are at an angle 351 of about 9° to the vertical. The bearing 349 is secured to a gear box 352, with which it is held by a supporting frame 353, which is adapted to be moved in a direction of height relatively to the frame 321 and to be fixed in position. The supporting frame 353 comprises two frame beams 354 and 355 fastened to supports 358 and 359 of the axle 325 so as to be pivotable about pins 356 and 357. The supports 358 and 359 are provided with locking pins 360 and 361 by which the supporting frame 353 is prevented from turning about the pins 356 and 357.

Between the delivery nozzle 339 and the spreading member 348 a dosing mechanism 362 is arranged similar to the dosing mechanism 106 of the first embodiment so that further specification is not required. The dosing mechanism 362 comprises an adjusting mechanism equal to the adjusting mechanism coupled with the dosing mechanism 106; further specification is therefore not necessary. The adjusting mechanism comprises a rope 363 held by a supporting arm 364 identical to the supporting arm 148 of the first embodiment. The rope 363 is provided with a handle 365.

The delivery nozzle 339 is joined by a guide plate 366, located above the spreading member 348 and having at the front, viewed in the direction of movement 336, a width 367 slightly larger than the diameter of the spreading member 348. From the front side the guide plate 366 extends to the rear, where its width is approximately three times the width at the front, the width 368 at the rear being slightly larger than the width 359 of the widest part of the hopper. At the sides 370 and 371 the guide plate has downwardly inclined rims 372, shown in FIG. 15. The portion 373 of the guide plate 366 from the delivery nozzle 339 is substantially flat, whereas the rear portion 374 of the plate which is approximately equal to half the length 373, is bent over downwardly. The plate 366 terminates at a short distance in front of the wheels 333 and 334 at a height 375 above the ground, which is approximately equal to one quarter of the diameter 376 of the wheels 333 and 334. The guide plate 366 is fastened near the hindmost bent over portion to supports 379 secured to the columns 324. The guide plate extends by the portion 373 at an angle of about 9° to the horizontal plane and is parallel to the spreading member 348.

The gear box 352 is coupled via a universal joint 377 with a driving shaft 378. As in the preceding embodiments the device can be attached by the coupling arm 335 to a tractor or the like moving the device the driving shaft 378 being coupled with the power takeoff shaft of the tractor. For spreading material the hopper is filled and at the area concerned the material can be fed from the hopper 323 to the spreading member 348 rotating about the axis 350 via the dosing mechanism 362. The mechanism 362 like in the preceding embodiments can be actuated by means of the rope 363 and the handle 365 secured thereto. The spreading member 348 will spread the material mainly to the rear viewed in the direction of movement 336. The material is guided by the guide plate 366 so that it cannot strike the rear wheels 333 and 334 and will be uniformly divided along the plate 366 and is deposited via the rear end of said plate on the ground. By the shape of the plate and the bent over rim 372 thereof the material can be spread over a width exceeding the width 368. The material can be distributed over about 10 to 12 ms. over equal distances on either side of the longitudinal axis 340.

For cleaning the various parts of the device the dosing mechanism 362 becomes easily accessible by loosening the locking pins 360 and 361, after which the supporting frame 353 can be moved downwardly and the dosing mechanism 362, like in the preceding embodiments, can be removed from between the delivery nozzle 339 and the spreading member 348, which is moved downwardly together with the supporting frame 353. Thus the parts near the delivery nozzle are readily accessible for cleaning and inspecting the machine. Owing to the position of the rotary axis 350 the material is ejected from the spreading member 348 obliquely downwards. The plate 366 matches this position and the portion 373 of said plate is approximately parallel to the plane in which the spreading member 348 rotates about the axis 350 in the operation of the device. The spreading member 348, formed by an ejector disc, is located, viewed in the direction of movement 336, at a short distance behind the axle 325. The distance 380 between the axle 328 with the wheels 334 and 333 and the axis of the spreading member 348 is sufficiently large for obtaining an advantageous distribution of the material over an adequate width.

One embodiment comprising two adjacent spreading members between the axles is shown in FIGS. 16, 17 and 18. This embodiment comprises a frame 401 having a rectangular framework 403 holding a hopper 402. The rectangular framework 403 has at the front two supporting columns 404 arranged on horizontal plates 405 and 406. The plates 405 and 406 are secured, viewed in the direction of movement 411 to the foremost axle 407. On the rear side the frame 401 comprises two supporting columns 408, secured to plates 409 and 410 arranged near the ends of the rear axle 412. The axle 412 has two ground wheels 413 and 414 and the axle 407 has two steerable wheels 415 and 416. The steerable wheels 415 and 416 are coupled with a coupling arm 417, which is connected with the axle 407 and is coupled with the steerable wheels as is described for the coupling arm of the first embodiment. This construction need therefore no further specification.

The hopper 402 is symmetrical to a vertical plane 413, extending transversely of the direction of movement 411 and the rear and front walls 454 and 455 of the hopper are at an angle 456 of about 30° to the horizontal plane. The hopper 402 comprises delivery funnels 418 and 419 located each on one side of the longitudinal axis 417. The delivery funnels 418 and 419 extend over a height 420 which is approximately equal to half the height 421 of the hopper. In this embodiment the height 421 is approximately 3.5-times the height 420. The separation between the funnels 418 and 419 is located in a vertical plane going through the longitudinal axis 417 of the device (see FIG. 17). Each of the funnels 418 and 419 has a delivery nozzle 422 and 423 respectively and beneath the delivery nozzle 422 a spreading member 424 and beneath the delivery nozzle 423 a spreading member 425 are provided. Each of the spreading members, as is shown for the spreading member 424 in FIG. 16, is fastened to an upwardly extending shaft journaled in a bearing 426 which forms part of a gear box 427. The spreading member 425 is fastened to a shaft journaled in a gear box 428. The gear box 427 is coupled by an auxiliary shaft 429 with the driving members in a gear box 430, which is secured to the front axle 417. The transmission of the gear box 428 is linked by an auxiliary shaft 431 with the transmission of the gear box 430. The gear box 430 is coupled with a driving shaft 432, which can be connected with the power takeoff shaft of a tractor propelling the device. The tractor can be coupled with the coupling arm 417. The gear boxes 427 and 428 are secured to a frame beam 433, which is coupled with the ends of the frame arms 434 and 435, which are pivoted to aligned pins 436 and 437 on supports 438 and 439, arranged on the axle 407. The hopper 402 is provided with arms 440 and 441 with which the frame arms 434 and 435 can be coupled by means of removable fixing pins 442 and 443.

A dosing mechanism 444 is arranged between the delivery nozzle 422 and the spreading member 424 and a dosing mechanism 445 is located between the delivery nozzle 423 and the delivery member 425. The dosing mechanisms 444 and 445 are constructed like the dosing mechanism 106 of the first embodiment. Each of the dosing mechanisms 444 and 445 is provided with a control-mechanism corresponding with the control-mechanism of the dosing mechanism 106. FIG. 16 shows the rope 446 for the control-mechanism of the dosing mechanism 444. A handle 447 corresponding with the handle 141 is also shown in FIG. 16.

For using the device it is attached by the coupling arm 417 to a tractor or the like, the driving shaft 432 being connected with the power takeoff shaft of the tractor. The material in the hopper 402 of a capacity of about 8 cubic meters can be distributed during the movement of the device over a large area. The supply of material to the spreading members can be regulated by means of the dosing mechanisms in the same manner as in the preceding embodiments. The spreading member 424 is caused to rotate by the driving shaft via the transmission members in the direction of the arrow 448 and the spreading member 425 in the direction of the arrow 449 about their respective, upwardly extending rotary axes. The spreading members thus rotate in relatively opposite directions. Each of the spreading members is capable of distributing the material over a strip covering equal distance on either side of the longitudinal axis 427 of the device. Each of the spreading members covers a strip of a width of about 10 ms. Since during the movement each of the spreading members covers the same strip of land, a uniform distribution spectrum can be obtained, since any irregularities in the distribution by one spreading member are practically compensated by the other spreading member. If desired, the dosing mechanisms can be adjusted so that the spreading member 424 distributes the material only on one side of the longitudinal axis 417 and the spreading member 425 distributes the material only on the other side of the longitudinal axis 417. Each of the spreading members can thus cover a strip located on the same side of the longitudinal axis 417 where the spreading member is located. The spreading members are arranged midway between the axles 407 and 412 viewed transversely of the direction of movement 411 when the device is operating. The distance 450 between the axle 407 and the vertical plane 413 going through the rotary axes of the spreading members is equal to the distance 451 between the axle 412 and the plane 413. The spreading members are located at such a distance from the vertical plane going through the longitudinal axis 417 that the outer circumferences of the spreading members are approximately coplanar to the outer side of the device as will be apparent from FIG. 17.

The spreading members and the associated dosing mechanisms as well as the bottom side of the hopper are readily accessible for cleaning the device by removing the locking pins 442 and 443. The coupling of the frame arms 434 and 435 with the supporting arms 440 and 441 is thus interrupted so that the beam 433 with the arms 434 and 435 can be moved downwardly with respect to the further frame parts about the pins 436 and 437. After the downward movement of the supporting frame with the spreading members 424 and 425 these members are readily accessible, while the dosing mechanisms 444 and 445 can be removed from between the delivery nozzles of the hopper and the spreading members so that they can be readily cleaned or inspected.

FIGS. 19, 20, 21 and 22 show an embodiment of a device for distributing material comprising a frame 501. The frame 501, like in the preceding embodiments, comprises a frame-shaped upper portion 502 having at the front two columns 503, one of which is shown in the Figures. On the rear side, viewed in the direction of movement 504 of the device, the frame 501 comprises two columns 505 and 506. The columns 503 are secured to horizontal plates 507 and 508 of a front axis 509. The columns 505 and 506 are secured to horizontal plates 510 and 511 arranged near the ends of a rear axle 512. The frame 501 is made of sheet material and the columns 503, 505 and 506 have a rectangular horizontal section, their lower ends being narrower than their upper ends. As in the preceding embodiments the framework 502 comprises two long frame beams and two short frame beams, each having a substantially triangular section and being made of sheet material and being integral with the supporting columns. The axles rigidly secured to the frame have two ground wheels 513 and 514 on the axle 512. The front axle 509 is provided with ground wheels 515 and 516 adapted to turn about vertical axes. The steerable ground wheels 515 and 516 are coupled with a coupling arm 517. The coupling of the coupling arm 517 with the steerable wheels and the connection of said arm with the front axle 509 is identical to the coupling of the coupling arm 90 of the first embodiment so that this needs no further specification.

The frame 501 holds a hopper 518, arranged in the rectangular framework 502. If desired, the beams of the frame made of sheet material may be integral with the hopper walls, the various parts then being welded to each other. Also in the preceding embodiments the various frame parts of sheet material may be welded to each other and be integral with the hopper, the latter then being welded to the frame. As an alternative, other constructions may be used for securing the hopper to the frame. The hopper may be secured to the frame so that it can be detached from the frame. The hopper 518, like the frame 501, is symmetrical to a vertical plane going through the longitudinal axis 519 of the device. The hopper 518 comprises two delivery funnels 520 and 521 located one after the other in the direction of movement 504. Each of the delivery funnels 520 and 521 has a height 522 approximately equal to one quarter of the overall height 523 of the hopper. The delivery funnel 521 joins the front wall 524 of the hopper which is at an angle 525 of about 45° to the horizontal plane. The rear wall 526 of the hopper, which is at an angle 527 of about 45° the horizontal plane, joins a slightly less inclined rear wall of the delivery funnel 520. The front wall 528 of the funnel 520 and the rear wall 529 occupy differently inclined positions relative to the horizontal plane, the wall 528 being at a slightly smaller angle to said plane than the wall 529. The positions of these walls and the height 522 are also determinative of the parts of the delivery funnels 520 and 521 in the overall quantity of the hopper. This is described with reference to the hopper 165 in FIG. 8.

Beneath the delivery funnel 520 a delivery nozzle 530 is arranged and a delivery nozzle 531 is arranged beneath the delivery funnel 521. A spreading member 532, adapted to rotate about a rotary axis 539, joins the delivery nozzle 530 and a spreading member 533 adapted to rotate about a rotary axis, joins the delivery nozzle 531. The spreading member 532 is secured to a shaft 534, which is at an angle 535 of about 3° to the horizontal plane. The shaft 534 is journaled in the delivery nozzle 530 and is connected at the front of the delivery nozzle 533 with transmission members in a gear box 536. The delivery member 533 is secured to a shaft 537 which is parallel to the shaft 534. The two shafts are parallel to a vertical plane going through the longitudinal axis 519 of the device, the center lines of said shafts being located in said plane. The shaft 537 is coupled by way of an auxiliary shaft 538 with the transmission members in the gear box 536. The transmission in the gear box 536 is formed by two interengaging gear wheels 539 and 540. The front end of the shaft 537 is coupled with a driving shaft 541. The two spreading members 532 and 533, like the delivery nozzles are located, viewed transversely of the direction of movement 504, between the axles 509 and 512 and the wheels 513 and 515. A dosing mechanism 542 is arranged between the spreading member 532 and the delivery nozzle 530. This dosing mechanism comprises a wall 570 arranged on the nozzle 530 and having two outlet ports 543 and 544. At the side of said wall of the delivery nozzle 530 a disc 545 is provided, which has two ports 546 and 547. The ports 546 and 547 are identical to the ports 543 and 544 and occupy the same positions around the axis 534 as the ports 543 and 544. The disc 545 is displaceable and fixable in a plurality of positions along the delivery nozzle so that the ports 546 and 547 can overlap the ports 543 and 544 to a greater or lesser extent for closing the outlet ports 543 and 544 accordingly.

The dosing member 545 is provided with an arm 547, which is connected by two coupling rods 548 and 549 with a control-shaft 550, which is journaled in supports 551 secured to the hopper. A dosing mechanism 552 is arranged between the delivery nozzle 537 and the spreading member 533; its construction is like that of the dosing mechanism 542. Further specification is therefore not necessary. The dosing mechanism 552 is coupled in the same manner as the dosing mechanism 542 with the control-shaft 550 extending along the lower side of the hopper. The front end of the control-shaft 550 is provided with an arm 553, which is connected with a coupling rod 554. The coupling rod 554 is coupled with a control-arm 555, which is fastened to the axle 509 so as to be rotatable about a horizontal shaft 556. The control-arm has a handle 557 and is adapted to be moved along a guide 558, relatively to which the arm 555 can be fixed in one of a plurality of positions with the aid of fixing means controllable near the handle and not shown in detail in the drawings.

The delivery nozzles 530 and 531 accommodate agitators 559 and 560 respectively, which are coupled with the shafts 534 and 537.

For taking the device into use, the coupling arm 517 is attached to a tractor or the like. The front end of the driving shaft 541 is connected with the power takeoff shaft of the tractor. The dosing members 542 and 552 are adjustable so that the outlet ports of the hopper can be closed. The hopper can receive the material to be spread and the device is transported to the area concerned, after which the outlet ports can be opened to a greater or lesser extent by adjusting the dosing mechanisms. The quantity fed per unit time from the hopper to the spreading members can be regulated by causing the ports 543 and 544 to overlap the ports 546 and 547 to a greater or lesser extent. The selected position of the dosing members 545 and hence the relative positions of the ports can be fixed by means of the control-member 555. The material flows during the movement of the device in the direction of the arrow 504 from the hopper to the spreading members 532 and 533, which are caused to rotate by means of the driving shaft 541 and the further transmission members and distribute the material over a wide strip. The material may be distributed over a width of 8 to 12 ms. Owing to the transmission in the gear box 536 formed by two interengaging gear wheels the spreading member 533 will rotate in a sense opposite that of the spreading member 532. The spreading member 533 rotates, for example, in the direction of the arrow 561 about its axis, whereas the spreading member 532 rotates in the direction of the arrow 562 about its axis. The rotary axes of the spreading members formed by the center lines of the shafts 534 and 537 extend substantially in the direction of movement of the device.

The supply of material through the outlet ports 543 and 544 to the spreading members is such that the spreading member 533 distributes the material, viewed in the direction of movement 504, on the right-hand side of the longitudinal axis 519 of the device, whereas the spreading member 532 distribute the material on the left-hand side of the longitudinal axis 519. The strip covered by each of the spreading members will overlap the other strip only over a small distance so that the material is uniformly distributed over the whole strip.

Although this is not shown in the drawing, the dosing mechanisms 543 and 552 may be constructed so that the dosing plates for example the plate 545 can be displaced together with the wall 537 associated with the delivery nozzle 530 and having the outlet ports 543 and 544 and be fixed at will in one of a plurality of positions about the axes 534 and 537 respectively of the spreading members formed by ejector discs. Thus the place of the outlet ports around the rotary axes of the spreading members can be shifted so that the direction of distribution of the material can be varied. This may be important for distributing different materials at different times. It is thus furthermore possible to adjust the dosing mechanisms so that each of the spreading members distributes the material over the same strip of land, for example, both on one side of the longitudinal axis 519 over equal distances on either side thereof.

Although in this embodiment the two dosing mechanisms 542 and 551 are coupled with only one control-member 555, each of the dosing members may be coupled with a different control-member. This permits of spreading material, for example, by only one spreading member.

As is described with reference to FIG. 8, this embodiment also permits of distributing other material, for example, via the funnel 520 by the spreading member 532 than via the funnel 521 by the spreading member 533. When two kinds of material are distributed it may be advantageous to have the two spreading members cover the same strip of land during the movement of the device. For this purpose it may be important for the wall with the outlet ports 543 and 544 to be displaceable with the dosing plate around the axis of the spreading member.

Although in this embodiment the outlet ports 543 and 544 and the corresponding outlet ports 546 and 547 are turned over 180° relatively to each other about the axes of the spreading members, two or more ports may be arranged in a different manner about the axes of the spreading members so that the material can be distributed in any desired way. By arranging the spreading members between the two axles, they are screened against obstacles which the device might strike or pass by. The spreading members are located completely beneath the hopper and between the supporting columns of the frame coupled with the two axles. The spreading members rotate substantially parallel to a vertical or substantially vertical plane transverse of the direction of movement. The material is thus ejected mainly transversely of the direction of movement 504 so that the path between the spreading member and the receiving area will not be disturbed by frame parts which might adversely affect the uniform distribution of the material.

It will be obvious that if desired the two ejector discs may be coupled with the driving gear so that they move in the same directions about their axes. For this purpose a third gear wheel may be provided between the wheels 539 and 540 in the gear box 536. As an alternative the shafts 530 and 537 may be arranged horizontally and directly coupled with each other without transmission gear.

When the device is in use, an adequate flow of material to the delivery nozzles via the funnels 520 and 521 is ensured by the inclined positions of the front and rear walls 528 and 529. The sidewalls 563 and 564 are at an angle 565 of about 50° to the horizontal plane. Consequently an adequate flow of material to the delivery nozzles is ensured along the sidewalls. The agitators 559 and 560 in the delivery nozzles further ensure a satisfactory passage of material through the nozzles and ports towards the spreading members. This will result in a uniform distribution of the material.

FIG. 23 shows an embodiment many structural parts of which are similar to those of the embodiment shown in FIGS. 19 to 22. The embodiment shown in FIG. 23 comprises a frame 601 having a rectangular framework 602 holding a hopper 603. The frame 601 comprises at the front of the framework 602 two supporting columns 604, only one of which is shown in FIG. 23. Near the rear side the frame 601 comprises two supporting columns 605, only one of which is shown in FIG. 23. The supporting columns 604 are secured to the foremost axle, viewed in the direction of movement 608, and the supporting columns 605 are fastened to a rear axle 607. The axle 607 is provided with ground wheels 609 and the axle 606 has two steerable wheels 610. The steerable wheels 610 are connected with a coupling arm 611 so that the wheels 610 can be controlled by the arm 611. For this purpose the coupling arm 611 is coupled with the wheels 610 in the same manner as is described for the steerable wheels in the preceding embodiments. Also in this embodiment the coupling arm 611 is coupled with the front axle 606 in the same manner as in the first embodiment with the coupling arm 90.

The hopper 603 comprises a delivery funnel 612 arranged between the axles 606 and 607 viewed transversely of the direction of movement 608. The delivery funnel 612 opens out in a delivery nozzle 613. The hopper comprises a delivery funnel 614 opening out in a delivery nozzle 615. Viewed in the direction of movement 608 the delivery nozzle 615 is located behind the axle 607, whereas the delivery nozzle 613 is located between the axles 606 and 607. The delivery funnel 612 has a front side which is integral with the front side 616 of the hopper, which is at an angle 617 of about 40° to the horizontal plane. The rear side 618 of the hopper 603 is integral with the rear side of the delivery funnel 614. The rear side 618 is at an angle 619 of about 60° to the horizontal plane. The rear side of the delivery funnel 612 has a wall 620 extending substantially parallel to the rear wall 619 of the hopper. The front side 621 of the delivery funnel 164 is at an angle 622 of about 30° to the horizontal plane. The height 623 of the delivery funnels 612 and 614, as in the preceding embodiment, is equal to about one quarter of the height 624 of the hopper 603. The sidewalls of the hopper 603 extend approximately in the same manner as the walls 563 and 564 of the preceding embodiment and like the latter they terminate in the delivery funnels 612 and 614. The center of the delivery nozzle 613 is at a distance 625 from the axle 606 which is about twice the distance 626 between the delivery nozzle 613 and the rear axle 607. The delivery nozzle 613 is associated with a spreading member formed by an ejector disc 627 and the delivery nozzle 615 is associated with a spreading member 628. The spreading members 627 and 628 are arranged like the spreading members of the embodiment shown in FIGS. 19 to 22 and are coupled with a driving shaft 629 so that this need not be further described. Dosing mechanisms 630 and 631 are arranged between the spreading members 627 and 628 and the associated delivery nozzles 613 and 615; the construction thereof is identical to that of the dosing mechanisms 542 and 552 and they can be actuated in the same manner by a control-arm 632 corresponding with the arm 555 of the preceding embodiment. The corresponding structures are therefore not shown in detail in FIG. 23.

For taking the device into use it is coupled again with a tractor or the like by means of the coupling arm 611. The driving shaft 629 is coupled with the power takeoff shaft of the tractor. The material contained in the hopper 603 can be fed in regulated quantities per unit time to the ejector discs 627 and 628 via the dosing mechanisms. The ejector discs 627 and 628 can distribute the material each over a different strip on either side of the longitudinal axis of the device, but if desired they may distribute the material also over the same strip. By providing only one spreading member between the axles, the latter may be arranged in this structure at a distance 633 from each other which is smaller than the distance between the axles of the preceding embodiment. Owing to the shape of the spreading arms of the spreading members 627 and 628, which arms are inclined to the rotary axis (FIG. 23) the material is spread over a truncated cone area, the apex of the cone approximately corresponding with the angle between the spreading arms and the rotary axis of the spreading member. The spreading member 627 occupies such a position that the material reaches the ground before it can strike the front sides of the wheels 609. The spreading member 628 arranged behind the rear wheels 609 can distribute the material freely without being disturbed by frame parts. Consequently the two spreading members can distribute the material advantageously without being troubled by frame parts.

The devices in the preceding embodiments are particularly suitable for distributing fertilizer, while the device supported from four wheels will level to some extent the unevennesses of the ground, so that the positions of the spreading members will not change with respect to the area to be covered.

The devices with the steerable ground wheels can be readily controlled and moved by a tractor. The constructions shown with the forms of the frames and the hoppers as described are extremely suitable for carrying capacities of 2 to 10 cubic meters. In the foregoing embodiments the hoppers have a capacity of about 5 to 8 cubic meters. By arranging the walls of the hopper at angles to the horizontal plane, as described above, a robust hopper is obtained, in which the material can readily flow towards the outlets without the need for agitators or conveying means in the hoppers. This is advantageous with respect to the simplicity and the cost price of the device. It is furthermore important in this respect that the device does not comprise an engine, while the energy required for rotating the spreading members is derived from a tractor or the like. The device supported from its own ground wheels and adapted to be propelled can thus be simple.

Having thus described my invention what I claim as new and desire to secure by Letters Patent of the United States is:

1. A device for distributing material, including granular and powdery fertilizers, comprising a hopper on a frame and at least two spreading members, each of which is turnable about its respective substantially vertical rotary axis, one of said spreading members being located in back of the other spreading member, said vertical axes being located in a vertical plane containing the longitudinal axis of the device, each of said spreading members being mounted on a supporting frame work which is pivotably connected to said frame to be movable in an upward direction relative to said frame and fixable in at least one position, each of said supporting frame works being pivotable about a horizontal axis with respect to said frame, fixing members being provided to position each supporting frame work to said frame in at least one position, said frame being mounted on two axles with wheels thereon, one in back of the other, the front of said frame having a draw bar to connect said implement to a prime mover, plate means being positioned between each spreading member and said wheels to screen and cover parts of said implement from material being ejected by the spreading members.

2. A device as claimed in claim 1, wherein the rotary axes of said spreading members are at an angle of more than 4° and less than 20° to the vertical.

3. A device as claimed in claim 2, wherein the rotary axes of the spreading members are at an angle of about 7° to the vertical.

4. A device as claimed in claim 2, wherein said spreading members are inclined downwards towards each other.

5. A device as claimed in claim 1, wherein said spreading members are located each below its respective delivery part of the hopper, whereby, in operation said spreading members distribute the material over substantially the same strip of land.

6. A device as claimed in claim 5, wherein said spreading members are each arranged adjacent a bent portion of said plate means whereby one spreading member distributes the material to the rear, and the other spreading member distributes the material to the front.

7. A device as claimed in claim 1, wherein said spreading members are each coupled with a common driving mechanism whereby said members both rotate in the same direction about their respective axes.

8. A device as claimed in claim 1, wherein, viewed transversely of the direction of travel, said frame is supported by at least two ground wheels and said two spreading members are positioned between said ground wheels.

9. A device as claimed in claim 1, wherein, viewed transversely of the direction of travel of said device, said frame is supported on at least two ground wheels and, one spreading member is arranged between said ground wheels and the other is located behind the said ground wheels.

10. A device as claimed in claim 1, wherein each of said spreading members is coupled to its respective transmission member, the transmission members of said two spreading members being connected with each other via an auxiliary shaft.

11. A device as claimed in claim 10, wherein the transmission member of a forward spreading member, is coupled through a driving shaft with the power takeoff shaft of a prime mover.

12. A device as claimed in claim 1 wherein each of said spreading members is arranged beneath its respective delivery funnel of said hopper, and, viewed in the direction of travel, one of said delivery funnels is located to the rear of the other delivery funnel, the walls of said hopper being positioned at an angle of about 45° to the horizontal and the funnel walls between said two funnels each being at an angle of about 30° to the horizontal.

13. A device as claimed in claim 12, wherein one of said delivery funnels has a height approximately equal to one quarter of the height of said hopper.

14. A device as claimed in claim 1, wherein the pivotal axes of said two supporting frameworks are located on the sides of said spreading members directed away from each other.

15. A device as claimed in claim 14, wherein the supporting frameworks of said two spreading members are connected with each other and fixable together relative to said frame by means of a fixing member on said device.

16. A device as claimed in claim 15, wherein said fixing member is located midway between said two spreading members.

17. A device as claimed in claim 16, wherein, on one side of each of said spreading members, a screening plate of said plate means is mounted on said device to face the ground wheels.

18. A device as claimed in claim 17, wherein the screening plates are provided on their upper sides with a covering plate extending over said spreading members.

19. A device as claimed in claim 18, wherein the covering plates of said spreading members are located above same and coupled to form a single covering plate which extends substantially over the whole width of said device.

20. A device as claimed in claim 19, wherein the supporting frameworks are secured to said covering plate by said fixing member.

21. A device as claimed in claim 1, wherein said hopper has a delivery funnel provided with at least one outlet opening adjacent each spreading member through which material can pass from the container to said spreading members, said delivery funnels tapering downwards towards said spreading members and each of said funnels having a height which is at least about one fifth of the height of said hopper.

22. A device for distributing material, including granular and powdery fertilizers, comprising a hopper on a frame and at least two spreading members each of which is mounted on a rotary axis, each spreading member being mounted on a supporting framework pivotally connected to said frame, the framework of a first spreading member being releasably connected to the framework of a second spreading member by a fixing member and said fixing member being located between said first and said second spreading member when viewed from aside, plate means positioned above said spreading members to extend over substantially the entire width of said device and each framework being secured to said plate means by said fixing member, said fixing member comprising two rods secured to said plate means and provided at their lower ends with holders which fit tags on each framework, said tags having recesses to receive a fastening pin which is inserted through holes in said holders.

23. A device for distributing material, including granular and powdery fertilizers, comprising a hopper on a frame and at least two spreading members rotatable about substantially vertical axes, said vertical axes being located in the vertical plane along the longitudinal axis of the said device, said frame having two wheel axles, one located in back of the other, a running wheel being mounted on each of the ends of said axles, and a first of said spreading members being located between said wheel axles and a second spreading member being located in back of both of said wheel axles, said hopper having a delivery funnel tapering downwardly towards the center part of each of said spreading members and each funnel having at its lower part, outlet means with at least one outlet opening through which material can flow from said hopper to a spreading member, covering means being associated with said outlet means to more or less close and open said outlet opening, a draw bar connected to the front of said frame, control means connected to the covering means of each outlet means and said control means extending forwardly adjacent said draw bar.

24. A device for distributing material, including granular and powdery fertilizers, comprising a hopper on a frame and at least two spreading members rotatable about substantially horizontal axes, one of said spreading members being located in back of the other spreading member, said horizontal axes of said spreading members being located in a vertical plane which extends at least substantially along the longitudinal axis of said device, said hopper having a delivery funnel for each spreading member, each of said spreading members being located below its delivery funnel, each of said delivery funnels having a height which is at least one quarter of the height of said hopper, said device having two wheel axis connected to said frame with one axle being located in back of the other axle, and running wheels being mounted on said axles, a draw bar at the front of said device for connection to a prime mover.

25. A device as claimed in claim 24, wherein said two spreading members are located between said two wheel axles.

26. A device as claimed in claim 24, wherein one of said spreading members is located between said two wheel axles and the other of said two spreading members is located in back of said two wheel axles.

27. A device for distributing material, including granular and powdery fertilizers, comprising an elongated hopper on a frame with its long sides oriented in the direction of travel and at least two spreading members each rotatable about a substantially vertical axis, a first of said spreading members being located on one side of a vertical plane along the longitudinal axis of said device, and the second spreading member being located on the opposite side of said plane, said frame being provided with two wheel axles, one of which is located in back of the other and running wheels being mounted on the ends of said wheel axles, each of said spreading members being located adjacent a long side of said hopper when seen in plan view, said hopper having a delivery funnel tapering downwards towards the center part of each of said spreading members, the lower ends of said delivery funnels having outlet means with at least one outlet opening through which material can flow from said hopper to said spreading members.

28. A device as claimed in claim 27, wherein the axes of rotation of said spreading members are located at least substantially midway between the said two wheel axles.

29. A device as claimed in claim 28, wherein said two spreading members have a common connection to a supporting framework which is pivoted to said frame and displaceable upwardly and downwardly relative to said frame, fixing means associated with said framework to fix said supporting frame in at least one position relative to said frame.

30. A spreading device for granular and powdery fertilizer materials, comprising a hopper with a plurality of delivery funnels at the lower portion of said hopper, a rotary spreading member mounted beneath each of said funnels, said hopper being mounted on a frame supported on front and rear ground wheels, at least one of said funnels and its respective spreading member being positioned between the front and rear ground wheels, said funnels being of different capacities, the lower ends of said delivery funnels each having outlet means with at least one outlet opening through which material can flow to said spreading members and covering means associated with each outlet to more or less open each of said outlets whereby varying amounts of different materials can be spread simultaneously.